(12) United States Patent
Kalkunte et al.

(10) Patent No.: US 11,357,078 B1
(45) Date of Patent: *Jun. 7, 2022

(54) COMMUNICATION SYSTEM AND METHOD FOR HIGH-SPEED LOW-LATENCY WIRELESS CONNECTIVITY IN MOBILITY APPLICATION

(71) Applicant: PELTBEAM INC., Saratoga, CA (US)

(72) Inventors: Venkat Kalkunte, Saratoga, CA (US); Mehdi Hatamian, Mission Viejo, CA (US)

(73) Assignee: PELTBEAM INC., Saratoga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/451,180

(22) Filed: Oct. 18, 2021

Related U.S. Application Data

(63) Continuation of application No. 17/304,069, filed on Jun. 14, 2021, now Pat. No. 11,172,542.

(51) Int. Cl.
| | |
|---|---|
| *H04W 88/04* | (2009.01) |
| *H04W 72/04* | (2009.01) |
| *H04W 76/15* | (2018.01) |
| *H04W 4/46* | (2018.01) |

(52) U.S. Cl.
CPC .............. *H04W 88/04* (2013.01); *H04W 4/46* (2018.02); *H04W 72/046* (2013.01); *H04W 72/0413* (2013.01); *H04W 76/15* (2018.02)

(58) Field of Classification Search
CPC ....... H04W 88/04; H04W 4/46; H04W 76/15; H04W 72/0413; H04W 72/046
See application file for complete search history.

(56) References Cited

U.S. PATENT DOCUMENTS

| | | | |
|---|---|---|---|
| 9,591,676 B1* | 3/2017 | Lopes | H04W 84/005 |
| 2019/0053296 A1* | 2/2019 | Balappanavar | H04W 36/32 |
| 2019/0132709 A1* | 5/2019 | Graefe | G08G 1/096791 |

(Continued)

FOREIGN PATENT DOCUMENTS

WO 2017184190 A1 10/2017

OTHER PUBLICATIONS

Non-Final Office Action in U.S. Appl. No. 17/647,753 dated Apr. 18, 2022.

*Primary Examiner* — Jeffrey M Rutkowski
*Assistant Examiner* — Jasper Kwoh
(74) *Attorney, Agent, or Firm* — Chip Law Group

(57) ABSTRACT

A communication system includes a central cloud server having connectivity enhanced database that specifies uplink-and-downlink beam alignment-wireless connectivity relationships for a plurality of geographical areas for different service providers. The connectivity enhanced database is generated over a first period of time based on a plurality of vehicles. The central cloud server obtains sensing information from first edge device mounted at a new vehicle and causes one or more road-side unit (RSU) devices over a second period of time to direct one or more specific beams of radio frequency signals to service a donor side of first edge device of new vehicle when new vehicle arrives and moves along one or more first geographical areas of the plurality of geographical areas. The one or more specific beams are selected based on the connectivity enhanced database bypassing an initial access-search on first edge device and the one or more RSU devices.

20 Claims, 12 Drawing Sheets

(56) References Cited

U.S. PATENT DOCUMENTS

| | | |
|---|---|---|
| 2019/0208449 A1* | 7/2019 | Wang ...................... H04W 4/40 |
| 2019/0372837 A1* | 12/2019 | Yang ...................... H04L 43/08 |
| 2020/0128591 A1* | 4/2020 | Subramanian ........ H04L 5/0037 |
| 2020/0249039 A1* | 8/2020 | Lassoued ................ G06N 20/00 |
| 2020/0252477 A1 | 8/2020 | Acharya et al. |
| 2020/0257310 A1* | 8/2020 | Du ........................... H04W 4/40 |
| 2020/0314614 A1* | 10/2020 | Moustafa ............ H04L 67/2842 |
| 2021/0051546 A1 | 2/2021 | Sayenko et al. |
| 2021/0099848 A1* | 4/2021 | Ruan ...................... H04W 36/03 |
| 2021/0345087 A1 | 11/2021 | Chakraborty et al. |
| 2021/0368308 A1 | 11/2021 | Katardjiev et al. |

\* cited by examiner

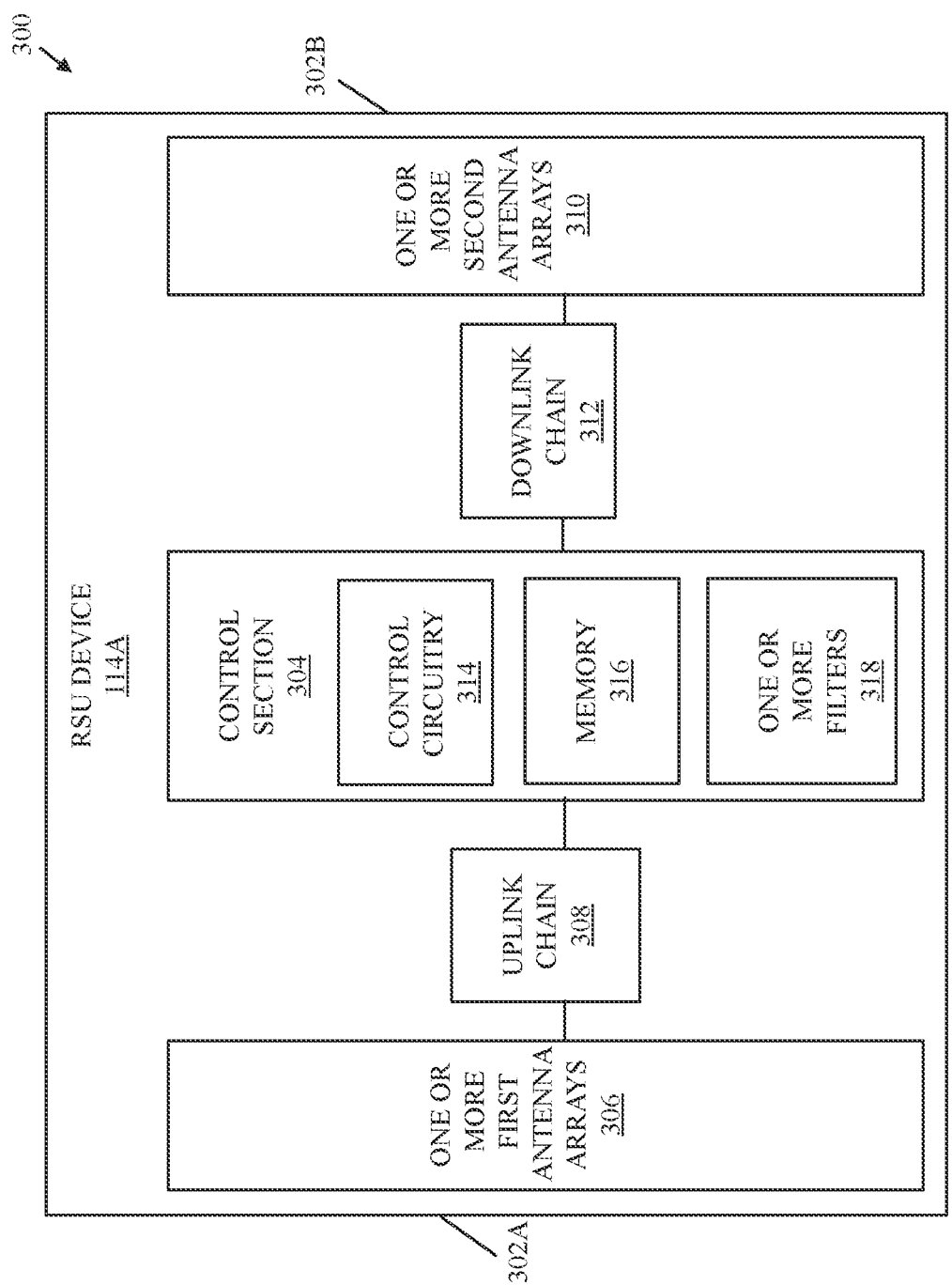

COMMUNICATION SYSTEM AND METHOD FOR HIGH-SPEED LOW-LATENCY WIRELESS CONNECTIVITY IN MOBILITY APPLICATION

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 17/304,069, filed on Jun. 14, 2021.

FIELD OF TECHNOLOGY

Certain embodiments of the disclosure relate to a wireless communication system. More specifically, certain embodiments of the disclosure relate to a communication system and a method for high-speed, low-latency wireless connectivity in mobility applications.

BACKGROUND

Wireless telecommunication in modern times has witnessed the advent of various signal transmission techniques and methods, such as the use of beamforming and beam steering techniques, for enhancing the capacity of radio channels. Latency and the high volume of data processing are considered prominent issues with next-generation networks, such as 5G. Currently, the use of edge computing in next-generation networks, such as 5G and upcoming 6G, is an active area of research, and many benefits have been proposed, for example, faster communication between vehicles, pedestrians, and infrastructure, and other communication devices. For example, it is proposed that close proximity of conventional edge devices to user equipment (UEs) may likely reduce the response delay usually suffered by UEs while accessing the traditional cloud. However, there are many open technical challenges for successful and practical use of edge computing in the next generation networks, especially in 5G or the upcoming 6G environment.

In a first example, it is known that a fast and efficient beam management mechanism may be a key enabler in advanced wireless communication technologies, for example, in millimeter-wave (5G) or the upcoming 6G communications, to achieve low latency and high data rate requirements. One major technical challenge of the mmWave beamforming is the initial access latency. During the initial access phase, a UE and or a conventional repeater device need to scan multiple beams to find a suitable beam for attachment, for example, using the standard beam sweeping operation in the initial access phase. This process may introduce considerable latency depending on the number of beams in a beam book and a baseband decoding hardware latency. Such latency becomes even more critical for mobile systems (e.g., when UEs are in motion) in which the channel, and hence beams or base stations, such as a gNodeB (gNB), may be rapidly changing. For example, currently, an average mmWave gNB handover time is on the order of 10-20 seconds, assuming about 500 meters of cell radius and a UE (e.g., a vehicle or a UE in the vehicle) traveling at the speed of 50 miles per hour (MPH), which is not desirable.

In a second example, Quality of experience (QoE) is another open issue, which is a measure of a quantitative measure of a user's holistic satisfaction level with a service provider (e.g., Internet access, phone call, or other carrier network-enabled services). The challenge is how to ensure seamless connectivity as well as QoE without significantly increasing infrastructure cost, which may be commercially unsustainable with present solutions.

In a third example, heterogeneity may be another issue, where many UEs may use different interfaces, radio access technologies (3G, 4G, 5G, or upcoming 6G), computing technologies (e.g., hardware and operating systems), and even one or more carrier networks, to communicate with the edge cloud. Such heterogeneity in wireless communication may further aggravate the challenges in developing a solution that is portable, practical, and upgradable across a different environment.

In yet another example, how to consider the dynamic nature of surroundings is another open issue, especially for next-generation networks, such as mmWave communication, that may adversely impact reliability in the provisioning of consistent high-speed, low latency wireless connectivity. In certain scenarios, the known challenges of mmWave, namely signal loss, poor reach, and easy blockage by moving or stationary objects in surroundings, are amplified, and uncertainty in achieving reliable wireless connectivity with QoE is increased as a result of the dynamic nature of surroundings, which is not desirable. Many communication systems work on the assumption that once the infrastructure is built, there is almost no change, which is not desirable as it may be erroneous, thereby impacting reliability, which is a prominent issue, especially in mobility applications, in which channels are rapidly changing due to movement of vehicles and UEs.

In another example, it is observed that batteries of UEs (e.g., smartphones) drain faster when the UEs are switched back and forth from the 4G to 5G radio access. In mobility scenarios, for example, when such UEs are present in a moving vehicle, the batteries of such UEs drain even faster, which is not desirable. Unfortunately, the above issues further add to this battery draining issue. For example, there is high battery consumption during the standard initial access search.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A communication system, a road-side unit (RSU) device, and a method for high-speed low-latency wireless connectivity in mobility application, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF DRAWINGS

FIG. 3 is a block diagram illustrating components of an exemplary RSU device, in accordance with an embodiment of the disclosure.

DETAILED DESCRIPTION OF THE DISCLOSURE

Figure 1:
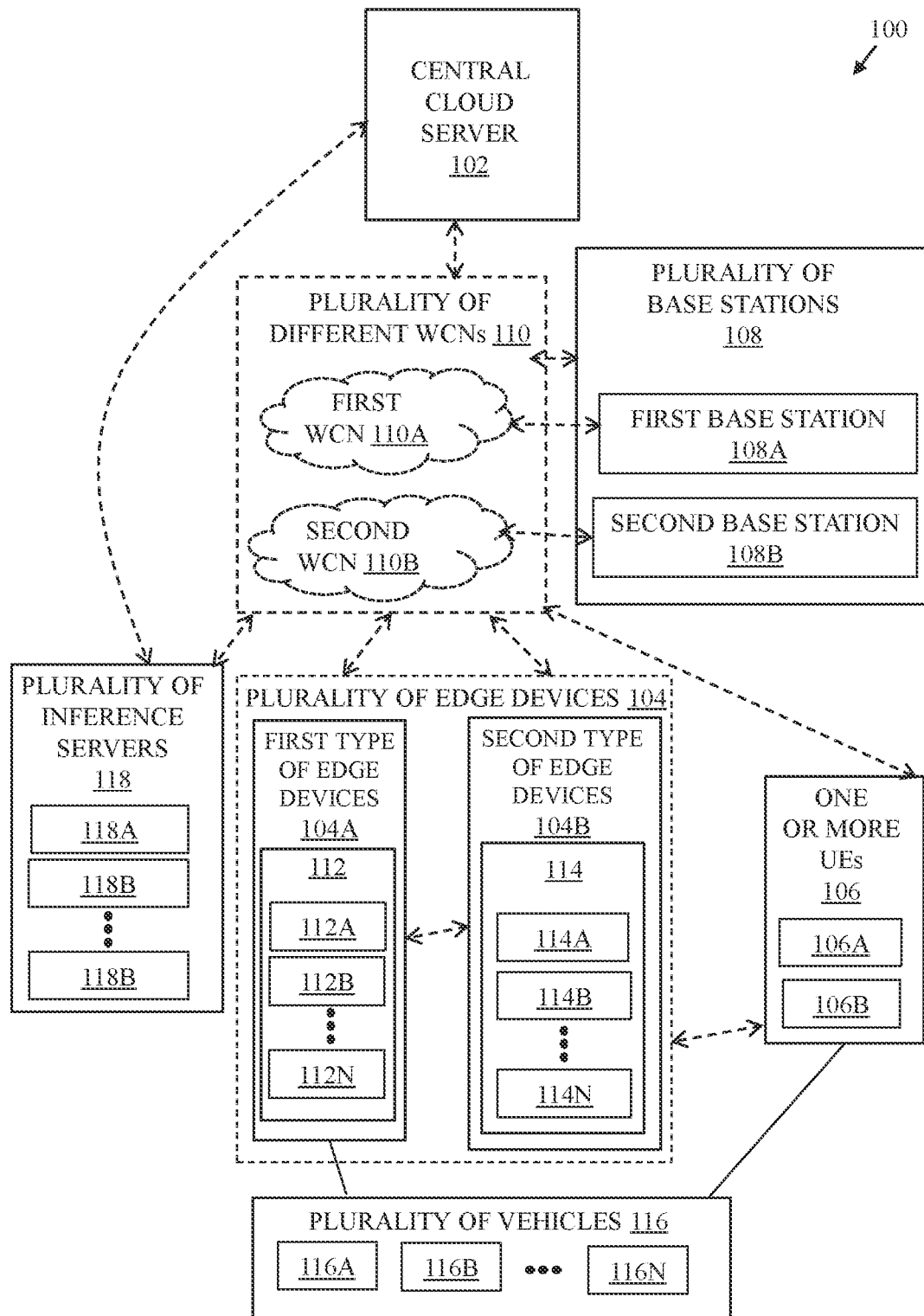
FIG. 1 is a network environment diagram illustrating various components of an exemplary communication system, in accordance with an exemplary embodiment of the disclosure.

Certain embodiments of the disclosure may be found in a communication system, a road-side unit (RSU) device, and a method for high-speed, low-latency wireless connectivity in mobility applications. The communication system, the RSU device, and the method of the present disclosure significantly reduces the latency involved in the initial access phase by making one or more edge devices arranged at a vehicle as well as one or more network nodes (e.g., RSU devices) bypass a standard initial-access search. For example, the existing average mmWave gNB handover time that is on the order of 10-20 seconds for a moving device is significantly reduced by approximately 60-90% depending on the location, the speed, and the orientation of the moving device (e.g., the vehicle or a user equipment (UE) in the vehicle). Such reduction in the gNB handover time is achieved using an intelligent database that is trained previously. The intelligent database may be referred to as a connectivity enhanced database that specifies a plurality of specific uplink and downlink beam alignment-wireless connectivity relationships for a surrounding area of each of the plurality of edge devices independent of a plurality of different wireless carrier networks of different service providers. A central cloud server and a plurality of inference servers of the communication system support the plurality of different wireless carrier networks, including different interfaces, radio access technologies, computing technologies (e.g., hardware and operating systems) and are easily upgradable without any need to change the infrastructure. Thus, the central cloud server in coordination with one or more inference servers of the plurality of inference servers, the one or more edge devices, one or more network nodes (e.g., RSUs and base stations) ensures seamless connectivity as well as Quality of Experience (QoE) without significantly increasing infrastructure cost separately for the plurality of different wireless carrier networks. Moreover, the central cloud server takes into account comprehensive sensing information surrounding each edge device. Thus, the dynamic nature of surroundings (e.g., any change in surroundings that has the potential to adversely impact signal propagation, cause signal loss, poor reach, or signal blockage by an object, such as a moving object or a stationary object, in the surroundings) is proactively handled and mitigated by the central cloud server by communicating wireless connectivity enhanced information from the connectivity enhanced database to the one or more edge devices of a vehicle. Such communication by the central cloud server may be done ahead of time (i.e., much before the actual time of a handover to a new gNB) according to a corresponding position of the one or more edge devices that enables easy handling and mitigation of any adverse impact on signal propagation due to the dynamic nature of surroundings for consistent high-performance communication. In the following description, reference is made to the accompanying drawings, which form a part hereof, and in which is shown, by way of illustration, various embodiments of the present disclosure.

FIG. 1 is a network environment diagram illustrating various components of an exemplary communication system, in accordance with an exemplary embodiment of the disclosure. With reference to FIG. 1, there is shown a network environment diagram of a communication system 100 that includes a central cloud server 102 and a plurality of edge devices 104. In the network environment diagram, there is further shown one or more user equipment (UEs) 106, a plurality of base stations 108, and a plurality of different wireless carrier networks (WCNs) 110, such as a first WCN 110A of a first service provider and a second WCN 110B of a second service provider. The plurality of edge devices 104 may include a first type of edge devices 104A and a second type of edge devices 104B. The first type of edge devices 104A may be edge devices that are movable, for example, one or more edge devices (e.g., edge devices 112A and 112B) arranged at each vehicle of a plurality of vehicles 116. The second type of edge devices 104B may be the edge devices that are immobile and deployed at different locations, such as a plurality of RSU devices 114. The communication system 100 may further include a plurality of inference servers 118 (such as inference servers 118A, 118B, ..., 118N) that may be communicatively coupled to the central cloud server 102 via an out-of-band communication network 120 and/or one or more in-band communication networks associated with the plurality of different WCNs 110.

The central cloud server 102 includes suitable logic, circuitry, and interfaces that may be configured to communicate with the plurality of edge devices 104, the one or more UEs 106, the plurality of base stations 108, the plurality of vehicles 116, and the plurality of inference servers 118. In an example, the central cloud server 102 may be a remote management server that is managed by a third party different from the service providers associated with the plurality of different WCNs 110. In another example, the central cloud server 102 may be a remote management server or a data center that is managed by a third party, or jointly managed, or managed in coordination and association with one or more of the plurality of different WCNs 110. In an implementation, the central cloud server 102 may be a master cloud server or a master machine that is a part of a data center that controls an array of other cloud servers communicatively coupled to it for load balancing, running customized applications, and efficient data management.

Each edge device of the plurality of edge devices 104 includes suitable logic, circuitry, and interfaces that may be configured to communicate with the central cloud server 102. The plurality of edge devices 104 may include the first type of edge devices 104A and the second type of edge devices 104B. The first type of edge devices 104A may be the edge devices 112A, 112B, . . . , 112N, which are movable. In an example, some edge devices, such as a repeater device, may be installed in a vehicle, and thus the location of such repeater device may vary rapidly when the vehicle is in motion. In some implementations, an edge device may be a part of a telematics unit of a vehicle. In some implementations, the first type of edge devices 104A may further include UEs controlled by the central cloud server 102. In such a case, the UEs may be controlled out-of-band, for example, in a management plane, by the central cloud server 102. Such one or more edge devices that are movable and/or associated vehicles (such as the vehicles 116A, 116B, . . . , 116N) are referred to as the first type of edge devices 104A. Examples of the first type of edge devices 104A may include, but may not be limited to, an XG-enabled repeater device, an XG-enabled relay device, or an XG-enabled mobile edge communication device, where the XG corresponds to 5G or 6G communication. The second type of edge devices 104B may be edge devices that are immobile and deployed at different locations. The plurality of RSU devices 114 may be the second type of edge devices 104B. Examples of the second type of edge devices 104B may include, but are not limited to, an XG-enabled repeater device, an XG-enabled small cell, an XG-enabled customer premise equipment (CPE), an XG-enabled relay device, an XG-enabled RSU device, or an XG-enabled edge communication device deployed at a fixed location.

Each of one or more UEs 106 may correspond to telecommunication hardware used by an end-user to communicate. Alternatively stated, the one or more UEs 106 may refer to a combination of a mobile equipment and subscriber identity module (SIM). Each of the one or more UEs 106 may be a subscriber of at least one of the plurality of different WCNs 110. Examples of the one or more UEs 106 may include, but are not limited to a smartphone, a virtual reality headset, an augmented reality device, an in-vehicle device, a wireless modem, a home router, a cable or satellite television set-top box, a VoIP station, or any other customized hardware for telecommunication.

Each of the plurality of base stations 108 may be a fixed point of communication that may communicate information, in form of a plurality of beams of RF signals, to and from communication devices, such as the one or more UEs 106 and the plurality of edge devices 104. Multiple base stations corresponding to one service provider may be geographically positioned to cover specific geographical areas. Typically, bandwidth requirements serve as a guideline for a location of a base station based on the relative distance between the plurality of UEs and the base station. The count of base stations depends on population density and geographic irregularities, such as buildings and mountain ranges, which may interfere with the plurality of beams of RF signals. In an implementation, each of the plurality of base stations 108 may be a gNB. In another implementation, the plurality of base stations 108 may include eNBs, Master eNBs (MeNBs) (for non-standalone mode), and gNB s.

Each of the plurality of different WCNs 110 is owned, managed, or associated with a mobile network operator (MNO), also referred to as a mobile carrier, a cellular company, or a wireless service provider that provides services, such as voice, SMS, MMS, Web access, data services, and the like, to its subscribers, over a licensed radio spectrum. Each of the plurality of different WCNs 110 may own or control elements of network infrastructure to provide services to its subscribers over the licensed spectrum, for example, 4G LTE, or 5G spectrum (FR1 or FR2). For example, the first base station 108A may be controlled, managed, or associated with the first WCN 110A, and the second base station 108B may be controlled, managed, or associated with the second WCN 110B, different from the first WCN 110A. The plurality of different WCNs 110 may also include mobile virtual network operators (MVNO).

Each of the plurality of vehicles 116 includes suitable logic, circuitry, and interfaces that may be configured to communicate with the central cloud server 102, for example, via the one or more edge devices arranged at each vehicle. In some implementations, one edge device, such as the edge device 112A, may be arranged at a given vehicle, such as the vehicle 116A. In an example, the edge device may be a part of a telematics unit of the vehicle. In some implementations, two edge devices, such as the edge devices 112A and 112B, may be arranged on some vehicles. In such a case, the edge devices 112A and 112B may be arranged at different positions in the vehicle. The plurality of vehicles 116 may include autonomous vehicles, semi-autonomous vehicles, and/or non-autonomous vehicles.

The plurality of inference servers 118 may be distributed at a plurality of different geographical zones such that each inference server serves a different geographical zone. Each of the plurality of inference servers 118 may be configured to obtain a subset of information from a connectivity enhanced database according to a corresponding geographical zone of the plurality of different geographical zones served by each of the plurality of inference servers 118. Each of the plurality of inference servers 118 includes suitable logic, circuitry, and interfaces that may be configured to receive a real-time or a near real-time request from an edge device of the plurality of edge devices 104 within its geographical zone. In an example, the real-time or the near real-time request may comprise one or more input features corresponding to sensing information of a given vehicle. The plurality of edge devices 104 corresponds to the plurality of RSU devices 114 (i.e., the second type of edge devices 104B) and the one or more edge devices (i.e., one or more of the first type of edge devices 104A) arranged on each vehicle of the plurality of vehicles 116. Based on the received request, a given inference server, such as the inference server 118A, may be further configured to communicate a response within less than a specified threshold time to each of the one or more RSU devices, wherein the response comprises wireless connectivity enhanced information including a specific initial access information to each of the one or more RSU devices to bypass the initial access-search on the one or more RSU devices as well as the first edge device of the given vehicle.

Beneficially, the central cloud server 102 and the plurality of edge devices 104 exhibit a decentralized model that not only brings cloud computing capabilities closer to UEs in order to reduce latency but also manifests several known benefits for various service providers associated with the plurality of different WCNs 110. For example, it reduces backhaul traffic by provisioning content at the edge, distributes computational resources geographically in different locations (e.g., on-premise mini cloud, central offices, customer premises, etc.,) depending on the use case requirements, and improves the reliability of a network by distributing content between edge devices and the centralized cloud server 102. Apart from these and other known benefits (or inherent properties) of edge computing, the central cloud server 102 improves and solves many open issues related to the convergence of edge computing and the next-generation wireless networks, such as 5G or upcoming 6G. The central cloud server 102 significantly improves the beam management mechanism of 5G new radio (NR), true 5G, and creates a platform for upcoming 6G communications, to achieve low latency and high data rate requirements. Based on the various information acquired from the plurality of vehicles 116 via the one or more edge devices (i.e., the first type of edge devices 104A) arranged on each vehicle of the plurality of vehicles 116 and the one or more network nodes, such as the plurality of RSU devices 114 (i.e., the second type of edge devices 104B) and the plurality of base stations 108, over a period of time, the central cloud server 102 creates a connectivity enhanced database that specifies a plurality of specific uplink and downlink beam alignment-wireless connectivity relationships for a surrounding area of each of the plurality of edge devices 104 independent of the plurality of different WCNs 110. This removes the complexity and substantially reduces the initial access latency as the standard beam sweeping operation in the initial access phase is bypassed and is not required to be performed at the end-user device (e.g., UEs) or edge devices, which in turn improves network performance of all associated WCNs of the plurality of different WCNs 110. The central cloud server 102 is able to handle heterogeneity in wireless communication in terms of different interfaces, radio access technologies (3G, 4G, 5G, or upcoming 6G), computing technologies (e.g., hardware and operating systems), and even one or more carrier networks used by the one or more UEs 106. Moreover, the central cloud server 102 takes into account the dynamic nature of surroundings holistically by use of the sensing information obtained from the plurality of edge devices 104 in real-time or near real-time to proactively avoid any adverse impact on reliability due to any sudden signal blockage, signal fading, signal scattering, or signal loss, thereby provisioning consistent high-speed, low latency wireless connectivity. Thus, the central cloud server 102 manifest higher QoE as compared to existing systems. Additionally, as the initial access information is provided in real-time or near real-time by a relevant inference server much ahead of time before an actual handover to a new gNB is expected, the disclosed communication system is able to proactively handle and avoid existing signaling overhead issues that result from quick variations of wireless channels in mobility applications, such as V2X systems. Furthermore, the one or more edge devices arranged on each vehicle substantially reduces the battery draining issue of the one or more UEs 106 when present in a vehicle in motion.

Figure 2:
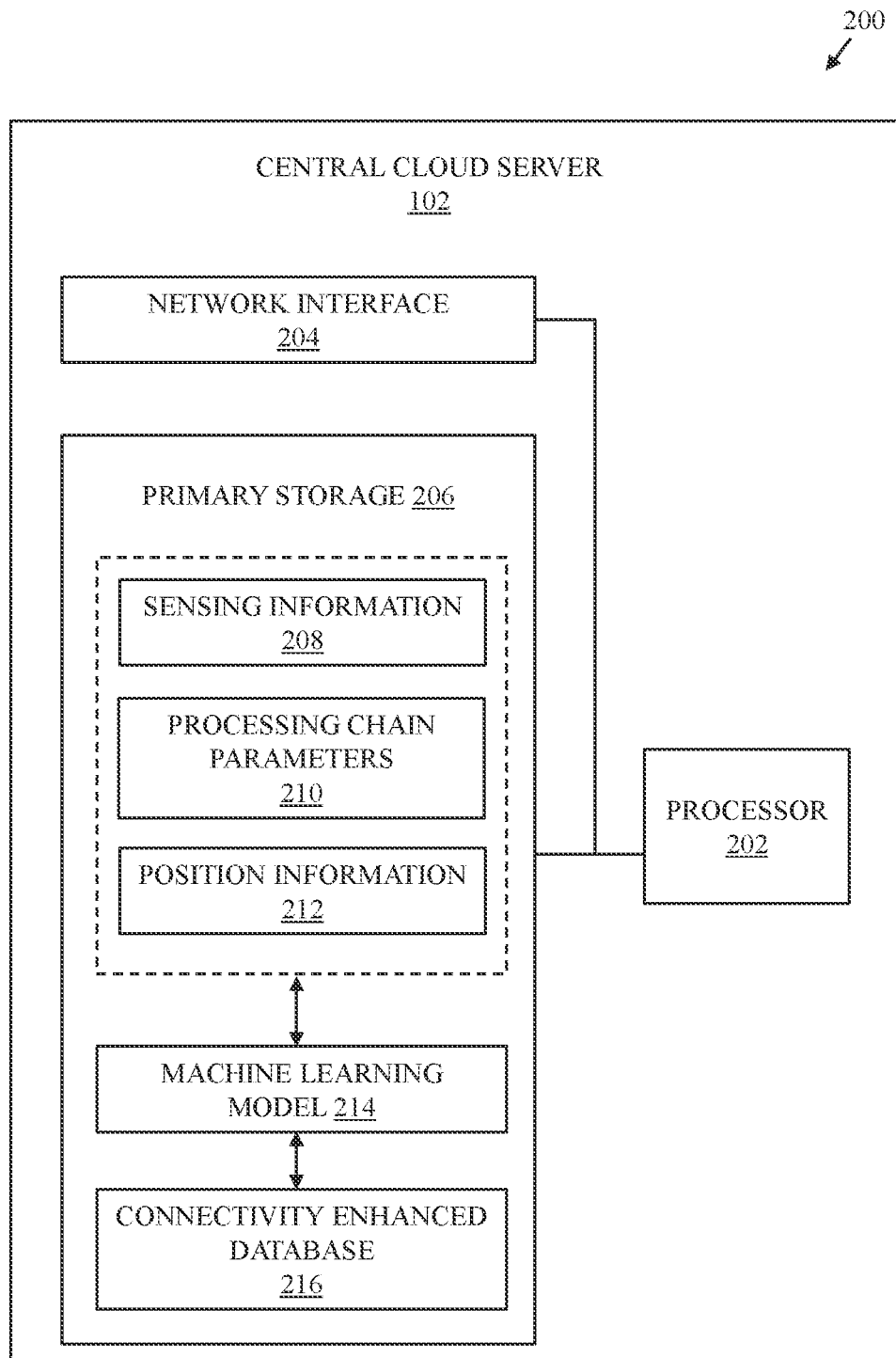
FIG. 2 is a block diagram illustrating components of an exemplary central cloud server, in accordance with an embodiment of the disclosure.

FIG. 2 is a block diagram illustrating components of an exemplary central cloud server, in accordance with an embodiment of the disclosure. FIG. 2 is explained in conjunction with elements from FIG. 1. With reference to FIG. 2, there is shown a block diagram 200 of the central cloud server 102. The central cloud server 102 may include a processor 202, a network interface 204, and a primary storage 206. The primary storage 206 may further include sensing information 208 and processing chain parameters 210. In an implementation, the primary storage 206 may further include position information 212 of a plurality of network nodes that includes the plurality of RSU devices 114 and the plurality of base stations 108. There is further shown a machine learning model 214 and connectivity enhanced database 216.

In operation, there may be a training phase and an inference phase. In the training phase, the processor 202 may be configured to obtain sensing information 208 from the plurality of vehicles 116 as the plurality of vehicles 116 move along a first travel path. Each vehicle, such as the vehicle 116A, may comprise one or more edge devices (e.g., one of or more of the first type of edge devices 104A) arranged such that a donor side of each edge device faces an exterior of each vehicle to communicate with one or more network nodes and a service side of each edge device faces an interior of each vehicle to service the one or more UEs 106 within each vehicle of the plurality of vehicles 116. Each of the plurality of vehicles 116 may be configured to communicate the sensing information 208 to the central cloud server 102, for example, via the one or more edge devices arranged at each vehicle.

In some implementations, one edge device, such as the edge device 112A, may be arranged at some vehicles, such as the vehicle 116A. For example, a single edge device, such as the edge device 112A, may be arranged at a roof panel of the vehicle 116A such that its donor side faces an exterior of the vehicle 116A to communicate with one or more network nodes, such as one or more base stations of the plurality of base stations 108, or the one or more RSUs of the plurality of RSU devices 114. A service side of the edge device, such as the edge device 112A, may be arranged to service components of the vehicle 116A and/or the one or more UEs 106 associated with the vehicle 116A, such as a sensor system of the vehicle 116A, an in-vehicle device, smartphones of users inside the vehicle 116A, an in-vehicle infotainment system, or other components of a vehicle where connectivity is desired. In an example, the edge device, such as the edge device 112A, may be a part of the telematics unit of the vehicle, such as the vehicle 116A. In some implementations, two edge devices, such as the edge devices 112A and 112B, may be arranged on some vehicles, such as the vehicle 116B. In such a case, the edge devices 112A and 112B may be arranged at different positions of the vehicle 116B. The plurality of vehicles 116 may include autonomous vehicles, semi-autonomous vehicles, and/or non-autonomous vehicles.

In accordance with an embodiment, at least the first UE 106A of the one or more UEs 106 may comprise an application that may cause the first UE 106A to be designated as a known user to the central cloud server 102. An exemplary application is described, for example, in FIG. 5. The first travel path may share a plurality of geographical areas that remain covered by a coverage area of one base station, uncovered by any base station, or partially or mutually covered by the plurality of base stations 108, such as the first base station 108A and the second base station 108B, of different service providers (i.e., the plurality of different WCNs 110).

As each vehicle, such as the vehicle 116A or the vehicle 116B, may comprise one or more edge devices (e.g., one of or more of the first type of edge devices 104A) mounted on it, a location of each of the one or more edge devices may change rapidly when a corresponding vehicle on which the one or more edge devices is installed is in motion. The one or more edge devices (e.g., one of or more of the first type of edge devices 104A) may periodically sense its surroundings and communicate the sensed data as the sensing information 208, to the central cloud server 102. The machine learning model 214 of the central cloud server 102 may be periodically (e.g., daily and for different times-of-day) trained on data points that are uploaded to the central cloud server 102.

In accordance with an embodiment, the sensing information 208 may comprise a location of each of the one or more edge devices arranged on each vehicle of the plurality of vehicles 116, a moving direction of the plurality of vehicles 116, a time-of-day, traffic information, road information, construction information, traffic light information, and information from one or more in-vehicle sensing devices of the plurality of vehicles 116. In some implementations, the sensing information 208 may further include a location of the one or more UEs 106. The location of the one or more UEs 106 may be obtained in a case where each of the one or more UEs 106 may have the application installed in it. The central cloud server 102 obtains the sensing information 208 and stores the data points of such sensing information 208 as input features.

In some implementations, the one or more edge devices of the first type of edge devices 104A mounted on each vehicle may be configured to utilize external sensing devices, such as light detection and ranging (Lidar), camera, accelerometer, Global Navigation Satellite System (GNSS), gyroscope, or Internet-of-Things (IoT) devices (e.g., video surveillance devices, road-side sensor systems for measuring speed, local road conditions, local traffic, and the like) located within its communication range to acquire sensing information 208 from such external devices. For example, an edge device may be a repeater device mounted on a vehicle and communicatively coupled to different in-vehicle sensors via an in-vehicle network so as to acquire the sensing information 208 from such in-vehicle sensors (i.e., the external sensors) in real-time or near time.

In some implementations, the sensing information 208 may further be obtained from the second type of edge devices 104B, such as the plurality of RSU devices 114. Each edge device of the plurality of edge devices 104 may use its own sensing mechanism, such as a sensing radar, to sense its surrounding environment. In such a case, when the sensing mechanism is present, the sensing information 208 may further be obtained from the second type of edge devices 104B, such as the plurality of RSU devices 114. In some implementations, the sensing information 208 may be further obtained from UEs (e.g., smartphones) controlled by the central cloud server 102. As the sensing information 208 is obtained periodically from various edge devices, such as the first type of edge devices 104A and the second type of edge devices 104B, of the plurality of edge devices 104, changes in the surroundings of each edge device is adequately captured and relayed to the central cloud server 102.

In accordance with an embodiment, the processor 202 may be further configured to generate supplementary information as insights based on a cross-correlation of data points of the obtained sensing information 208. When such data points of the sensing information 208 are cross-correlated with each other, supplementary information may be derived as insights by the central cloud server 102. For example, when traffic information of a surrounding area of a given RSU device, such as the RSU device 114A, having a first position is correlated with surrounding information at different times-of-day over a period of time, the processor 202 of the central cloud server 102 may be configured to determine a trend and a load associated with the given RSU device, such as the RSU device 114A, (and similarly for other RSU devices of the plurality of RSU devices 114) that may indicate an average number of vehicles and/or UEs expected to be serviced by the given RSU device, such as the RSU device 114A, at different times-of-day, one or more peak load time periods, one or more off-peak time periods. The processor 202 may be further configured to determine how many RSU devices are active or not active, which RSU devices may be employed to increase the coverage and data throughput and reduce latency, and the like.

In another example, more supplementary information may be derived as insights taking into account traffic information, road information, construction information, and traffic light information, and other sensed information. Each RSU device of the plurality of RSU devices 114 may use its own sensing mechanism, such as a sensing radar, to sense its surrounding environment and map its surrounding three-dimensional (3D) environment to generate a 3D environmental representation. The 3D environmental representation may indicate movable and immobile physical structures in the surrounding area of each of the RSU devices 114.

In accordance with an embodiment, the sensing information 208 may further comprise a distance of each of the one or more edge devices (e.g., of the first type of edge devices 104A) arranged on each vehicle of the plurality of vehicles 116 from other mobile objects and immobile objects in the surrounding area of each of the plurality of vehicles 116. In an implementation, the distance of the one or more edge devices (e.g., of the first type of edge devices 104A) arranged on each vehicle from other movable and immobile physical structures in the surrounding area may be determined at each of the one or more edge devices, such as the edge devices 112A and 112B, and then communicated to the central cloud server 102 as a part of the sensing information 208. In another implementation, the processor 202 may be further configured to determine the distance of each the one or more edge devices arranged at each vehicle from its surrounding objects, such as other vehicles, buildings, or edges of a building, distance of one or more serving base stations of the plurality of base stations 108, trees, and other immobile physical structures (such as reflective objects) or other mobile objects. Moreover, Lidar information from vehicles, information from a navigation system (such as maps, for example, identifying cross-sections of streets), satellite imagery of buildings of a surrounding area, bridges, any signal obstruction from a change in construction structure, etc., may be stored in the cloud, such as the central cloud server 102.

In accordance with an embodiment, each of the plurality of RSU devices 114 may be further configured to determine a distance from the one or more UEs 106 and other movable objects, such as one or more vehicles of the plurality of vehicles 116, and immobile physical structures in the surrounding area of each of the RSU devices 114. Such determined distance by each of the plurality of RSU devices 114 may be communicated to the central cloud server 102. In some implementations, the central cloud server 102 may be configured to determine such distance based on the position information 212 received from the plurality of the RSU devices 114. Additionally, the processor 202 of the central cloud server 102 may be further configured to cross-correlate the distances using the generated 3D environmental representation for a given surrounding area of a given RSU device for higher accuracy.

The machine learning model 214 of the central cloud server 102 may be periodically (e.g., daily and for different times of day) updated on such data points in real-time or near time. The central cloud server 102 may be further configured to cause the machine learning model 214 to find correlation among such data points to be used for a plurality of predictions and formulate rules to establish, maintain, and select one or more RSU devices in advance for various traffic scenarios to serve the one or more edge devices of the first type of edge devices 104A arranged at each vehicle (or the one or more UEs directly) and to identify improved (e.g., optimal) signal transmission paths to reach to the one or more edge devices of the first type of edge devices 104A arranged at each vehicle (or the one or more UEs directly) for efficient handover for wireless connectivity at a later stage (i.e., in the inference phase). Based on the sensing information 208 obtained from the plurality of vehicles 116 (and optionally from the plurality of RSU devices 114), the processor 202 may be further configured to detect where reflective objects are located and used that information in the radiation pattern of the RF signals, such as 5G signals. The sensing information 208 may be used to make a radiation pattern that is correlated to areas such that the communicated RF signals are not reflected back. This means that when one or more beams of RF signals are communicated from the one or more edge devices arranged at each vehicle and/or the plurality of RSU devices 114, comparatively significantly lower or almost negligible RF signals are reflected back to the one or more edge devices of the first type of edge devices 104A and the plurality of RSU devices 114 of the second type of edge devices 104B. The location of the reflective objects and the correlation of the areas associated with reflective objects with the radiation pattern to design enhanced or most suited beam configurations may be further used by the processor 202 to formulate rules for later use.

In accordance with an embodiment, the sensing information 208 may further comprise weather information. The processor 202 may be further configured to utilize the weather information to determine one or more changes in a performance state in different weather conditions of each of the one or more edge devices (i.e., the one or more edge devices arranged at each vehicle) across the plurality of geographical areas along the first travel path. It is known that more attention is provided in the region between 30-300 GHz frequencies due to the large bandwidth which is available in this region to enable the plurality of different WCNs 110 to cope with the increasing demand for higher data rates and ultra-low latency services. However, the signals at frequencies above 30 GHz may not propagate for long distances as those below 30 GHz. Moreover, there is signal attenuation due to weather factors, such as humidity, rain, ice, different types of storms, and even there is a difference observed during summer and winter on the signal power level. For example, the signal loss difference between winter and summer for 28 GHz may be about 1 dB, about 2 dB for 37 GHz, about 4 dB for 60 GHz. Such losses may increase with frequency and distance. The processor 202 utilizes such weather information to determine one or more changes in a performance state of each of the one or more edge devices (i.e., the one or more edge devices arranged at each vehicle) as well as the plurality of RSU devices 114 across the plurality of geographical areas along the first travel path in different weather conditions. Accordingly, the processor 202 by use of the machine learning model 214 may be configured to learn a correlation between different weather condition and signal power level and other performance state of each of the one or more edge devices arranged at each vehicle in servicing the one or more UEs 106. Accordingly, the processor 202 may be further configured to formulate rules to establish, maintain, and select one or more RSU devices in advance to mitigate signal losses in various weather conditions to serve the one or more edge devices arranged at each vehicle (or the one or more UEs 106 directly) and to identify improved (e.g., optimal) signal transmission paths to reach to the one or more edge devices arranged at each vehicle (or the one or more UEs 106 directly) at a later stage (i.e., in the inference phase). For example, the processor 202 may be further configured to cause the one or more edge devices arranged at each vehicle as well as the one or more RSU devices to select the most appropriate beam configurations or radiation pattern in real-time or near real-time in accordance with the weather condition obtained as a part of the sensing information 208 (i.e., in the inference phase).

In accordance with an embodiment, the processor 202 may be further configured to obtain processing chain parameters 210 from the donor side of each edge device of the plurality of vehicles 116 as the plurality of vehicles 116 move along the first travel path. As the one or more edge devices, such as the edge devices 112A and 112B, arranged at each vehicle may be in motion, the changes in a channel may be more prominent at the donor side that faces the one or more network nodes, such as the first base station 108A, the second base station 108B, and the one or more RSU devices, such as the RSU devices 114A and 114B. In accordance with an embodiment, the processing chain parameters 210 obtained from each edge device of the plurality of vehicles 116 may comprise information associated with elements of one or more cascaded receiver chains and one or more cascaded transmitter chains of each edge device, radio blocks information, and modem information of each edge device of the plurality of vehicles 116.

In some implementations, the processor 202 may be further configured to obtain processing chain parameters 210 from the plurality of edge devices 104 that includes both the first type of edge devices 104A (i.e., one or more edge devices arranged at each vehicle) and the second type of edge devices 104B, such as the plurality of RSU devices 114. Thus, the processing chain parameters 210 include information associated with elements of one or more cascaded receiver chains and one or more cascaded transmitter chains of each edge device, radio block information, and modem information of the plurality of edge devices 104. The central cloud server 102 may be configured such that it has access to certain defined elements or all elements of one or more signal processing chains of each of the plurality of edge devices 104. For example, each of an uplink RF signal processing chain and a downlink RF signal processing chain may include a cascading receiver chain for signal reception, which includes elements, such as a set of low noise amplifiers (LNA), a set of receiver front end phase shifters, and a set of power combiners. Similarly, each of the uplink RF signal processing chain and the downlink RF signal processing chain may further include a cascading transmitter chain for baseband signal processing or digital signal processing for signal transmission, which includes elements such as a set of power dividers, a set of phase shifters, a set of power amplifiers (PA). There may be other elements and circuits like mixers, phase-locked loops (PLL), frequency up-converters, frequency down-converters, a filter bank that may include one or more filters, such as filters for channel selection or other digital filters for noise cancellation or reduction. The central cloud server 102 may be configured to securely access, monitor, and configure the information associated with such elements of one or more cascaded receiver chains and one or more cascaded transmitter chains of each edge device to optimize each radio blocks and overall radio frequency signals, such as 5G signals.

In a first example, the central cloud server 102 may remotely access elements of the one or more signal processing chains, like the set of phase shifters, and utilize that, for example, to train the machine learning model 214, and optimize every block of an RF signal including phase (e.g., can control the phase-shifting), etc. In a second example, the central cloud server 102 may remotely access information associated with elements, such as a set of LNAs to train the machine learning model 214, and utilize that information, for example, to learn and control amplification of input RF signals received by an antenna array, such as the one or more first antenna arrays or the one or more second antenna arrays, in order to amplify input RF signals, which may have low-power, without significantly degrading corresponding signal-to-noise (SNR) ratio in the inference phase. In a third example, the central cloud server 102 may remotely access information (e.g., phase values of one or more input RF signals) associated with elements, such as set of phase shifters, to train the machine learning model 214, and control adjustment in phase values of the input RF signals, till combined signal strength value of the received input RF signals, is maximized to design beams in the inference phase. In a fourth example, the central cloud server 102 may be configured to train the machine learning model 214 with parameters (e.g., amplifier gains, and phase responses) associated with one or more first antenna arrays (e.g., the one or more first antenna arrays 306 or 426 of FIGS. 3 and 4B) or one or more second antenna arrays (e.g., the one or more second antenna arrays 310 or 430 of FIGS. 3 and 4B), and later use learnings in the inference phase to send control signals to remotely configure or control such parameters. In a fifth example, the central cloud server 102 may be configured to access beamforming coefficients from elements of the one or more signal processing chains to train the machine learning model 214 and use such learnings to configure, and control, and adjust beam patterns to and from each of the plurality of edge devices 104 (i.e., the one or more edge devices of each vehicle as well as the plurality of RSU devices 114). In a sixth example, as the central cloud server 102 has information associated with elements of one or more cascaded receiver chains and one or more cascaded transmitter chains of each edge device, the central cloud server 102 may configure dynamic partitioning of a plurality of antenna elements of an antenna array into a plurality of spatially separated antenna sub-arrays to generate multiple beams in different directions to establish independent communication channels with the one or more UEs 106 at the same time or in a different time slot. In a seventh example, since the central cloud server 102 has information associated with elements of one or more cascaded receiver chains and one or more cascaded transmitter chains of each edge device, the central cloud server 102 may be further configured to accurately determine a transmit (Tx) beam information, a receive (Rx) beam information, a Physical Cell Identity (PCID), and an absolute radio-frequency channel number (ARFCN), and a signal strength information associated with each of Tx beam and the Rx beam of the plurality of edge devices 104 for the plurality of different WCNs 110. In an eighth example, since the central cloud server 102 has information associated with elements of one or more cascaded receiver chains and one or more cascaded transmitter chains of each edge device, the central cloud server 102 may configure and instruct an edge device (e.g., mounted at each vehicle) for a suitable adjustment of a power back-off to minimize (i.e., substantially reduce) the impact of interference (echo or noise signals) and hence only use as much power as needed to achieve low error communication with one or more base stations in the uplink or the one or more UEs 106 in the downlink communication. In accordance with an embodiment, the central cloud server 102 may be further configured to configure, monitor, and/or provide management, monitoring, and/or configuration services to, various layers of each of the plurality of edge devices 104 to optimize blocks of radio and perform Radio access network optimization to improve coverage, capacity, and service quality.

It is known and specified in 3GPP that a radio frame of a 5G NR frame structure may include ten sub-frames, where each sub-frame, includes one or more slots based on different configurations. In an example, a sub-frame may include one slot, where each slot may include 14 symbols (e.g., 14 OFDM symbols). In a case where a sub-frame has two slots, then the radio frame has 20 slots. Similarly, in a case where the sub-frame has four slots, then the radio frame has 40 slots, where the number of OFDM symbols within a slot is 14. It is also known that NR Time-division duplexing (TDD) uses flexible slot configuration, where the flexible symbol can be configured either for uplink or for downlink transmissions.

In an implementation, the central cloud server 102 may obtain radio block information and may access decoded control information from each of the plurality of edge devices 104 (i.e., one or more edge devices arranged at each vehicle and the second type of edge devices 104B, such as the plurality of RSU devices 114). The decoded control information may include (or indicates) a periodicity and a downlink/uplink cycle ratio, a time division duplex (TDD) pattern, an NR TDD slot format, or a plurality of NR TDD slot formats in a sequence. In accordance with an embodiment, the central cloud server 102 may obtain a physical cell identifier (PCID), an absolute radio-frequency channel number (ARFCN), and other properties of the plurality of base station of the plurality of different WCNs 110 through the network (e.g., 4G LTE, 5G NR, Internet, or any other wireless communication network). The central cloud server 102 may further receive a channel quality indicator and other channel estimates as feedback from the plurality of edge devices 104 (i.e., one or more edge devices arranged at each vehicle and/or the second type of edge devices 104B, such as the plurality of RSU devices 114).

In accordance with an embodiment, by virtue of the obtained modem information from the plurality of edge devices 104, the central cloud server 102 may have information of more than one device modem and thus have holistic information (e.g., an operating behavior) of different modems of many edge devices in a geographical area, which can be used to train the machine learning model 214 and optimize the radio communication (e.g., signal propagation) holistically for the entire geographical area. In an implementation, a software application for each modem of an edge device may run on the central cloud server 102 rather in the modem of an edge device, such as a repeater device. For example, one virtual machine (VM) may be dedicated to one modem of an edge device. As the central cloud server 102 has information of more than one device modem, it will know about other modems of other edge devices in a given geographical area. Thus, the high computational resource capable device (i.e., the central cloud server 102) can optimize radio signal propagation and channel characteristic of the given geographical area more holistically for the plurality of different WCNs 110 instead of just one WCN, thereby improving network performance of the plurality of different WCNs 110, and providing high-performance wireless communication for the given geographical area (and similarly other geographical areas) to improve QoE.

In accordance with an embodiment, the processor 202 may be further configured to access a Serial Peripheral Interface (SPI) between a modem and the radio (e.g., the front-end RF section) of each of the plurality of edge devices 104 (i.e., one or more edge devices arranged at each vehicle and/or the second type of edge devices 104B, such as the plurality of RSU devices 114). The SPI may be a full-duplex bus interface used to send data between a control circuitry (e.g., a microcontroller or DSP) and other peripheral components, such as the modem, for example, a 5G modem, and sensing radar (when present) in an edge device. The SPI interface supports very high speeds and throughput and is suitable for handling a lot of data. In an example, the processing chain parameters 210 may be accesses using access to the SPI.

In accordance with an embodiment, the processor 202 may be further configured to obtain position information 212 of the one or more network nodes that includes the plurality of RSU devices 114 and the plurality of base stations 108 exclusively, partially, or mutually covering the plurality of geographical areas. The processor 202 may be further configured to correlate the obtained sensing information 208, the obtained position information 212, and the processing chain parameters 210 for different times of a day such that the connectivity enhanced database 216 is generated that specifies a plurality of specific uplink and downlink beam alignment-wireless connectivity relationships for a plurality of different locations of edge device within each of geographical area of the plurality of geographical areas of the first travel path and other travel paths in a given region (e.g., a city and similarly each region of a country). Alternatively stated, the processor 202 may be further configured to generate the connectivity enhanced database 216 over a first period of time, based on a correlation among the obtained sensing information 208, the processing chain parameters 210, and the position information 212 of the one or more network nodes, where the connectivity enhanced database specifies a plurality of uplink-and-downlink beam alignment-wireless connectivity relationships for each of the plurality of geographical areas along the first travel path for the different service providers. The correlation is executed not just for one WCN but holistically for the plurality of different WCNs 110. The correlation indicates that for a given set of input features extracted from the sensing information 208 and the position information 212, what is the most suitable (i.e., best) initial access information for a given edge device (i.e., a given edge device mounted on a vehicle and/or a given edge device of the second type of edge devices 104B, such as an RSU device) according to its position to service the one or more UEs 106 in its surrounding area such that a high-speed and low latency wireless connectivity can be achieved with increased consistency. The processor 202 may be further configured to determine the plurality of uplink and downlink beam alignment-wireless connectivity relationships for different times of a day. The connectivity enhanced database 216 may be a low-latency database, for example, "DynamoDB," "Scylla," or other proven and known low-latency databases that can handle one or more million transactions per second on a single cloud server. The time-of-day specific uplink beam-alignment-wireless connectivity relation specifies, for the given set of input features for a given time-of-day, which beam index to set at an edge device (e.g., mounted on a vehicle) for the uplink communication, a specific Physical Cell Identity (PCID) which indicates which gNB to connect to, or which WCN to select, which specific beam configuration to set, or whether a connection to the base station is to be established directly or indirectly in an NLOS path using one or more RSU devices of the plurality of RSU devices 114. Similarly, the time-of-day specific downlink beam-alignment-wireless connectivity relation specifies, for the given set of input features for a given time-of-day, which beam index to set at an edge device (e.g., an edge device mounted on a vehicle and/or an RSU device that services the edge device of the vehicle) for the downlink communication, which WCN to select, which specific beam configuration to set, what power level of the RF signal may be sufficient, or an expected time period to service one or more UEs, such as the first UE 106A, depending on the current location of the edge device. Thus, as the set of input features changes, the initial access information also changes for the given edge device according to the changed set of input features to continue servicing the one or more UEs, such as the first UE 106A, without any drop in QoE. Moreover, as the connectivity enhanced database 216 is independent of the plurality of different WCNs 110, the complexity and the initial access latency is significantly reduced as the standard beam sweeping operation in the initial access phase is bypassed and is not required to be performed at the end-user device or edge devices, which in turn improves network performance of associated WCNs of the plurality of different WCNs 110. Furthermore, this way, a consumer, such as the first UE 106A, is provided with the capability to choose which WCN (i.e., which service provider) they like to connect to, and this is enabled from the cloud, such as the central cloud server 102. The processor 202 may be configured to transfer such specific initial access information associated with a WCN, such as the first WCN 110A to the one or more edge devices of each vehicle, where such specific initial access information is used by the edge device to establish wireless connectivity by passing conventional initial-access search. For example, a consumer with a UE, such as the first UE 106A, subscribed to the first WCN 110A can request the edge device, such as the edge device 112A, arranged at the vehicle 116A to relay an RF signal of the first WCN 110A, and if the consumer with the UE, such as the first UE 106A, is subscribed to the second WCN 110B can request the edge device, such as the edge device 112A, of the vehicle 116A to relay an RF signal of the second WCN 110B. The correlation further improves QoE and indicates that for a given set of input features extracted from the sensing information 208 and the position information 212, insights are provided as to what were the processing chain parameters 210 when there was most suitable (i.e., best) initial access information for a given edge device, and hence it allows optimal management of network resources including the plurality of edge devices 104 in the inference phase.

In accordance with an embodiment, the processor 202 may be further configured to extract and tag parameters of the processing chain parameters 210 as learning labels (e.g., supervised learning labels or unsupervised output values). The obtained sensing information 208 and the position information 212 may be considered as input features, whereas the processing chain parameters 210 may be considered as learning labels for the correlation. The processor 202 may be further configured to execute a mapping of the learning labels with one or more input features of the obtained sensing information 208 and the position information 212 until the plurality of uplink and downlink beam alignment-wireless connectivity relationships is established for each of the plurality of geographical areas along the first travel path for the different service providers.

In an implementation, a machine learning algorithm, for example, an artificial neural network algorithm, may be used at the beginning before training with the real-world training data of input features and parameters of the processing chain parameters 210 as supervised learning labels. When the machine learning algorithm is passed through the training data of correlated input features and parameters of the processing chain parameters 210, the machine learning algorithm determines patterns such that the input features (e.g., a position of the one or more edge devices of each vehicle, a position of one or more RSU devices of the plurality of RSU devices 114, a position of the plurality of base stations 108, a weather condition, a moving direction, a time-of-day, any change in a surrounding area in terms of signal blockage or attenuation, etc., traffic condition, road information, an association with a current WCN, and current connection parameters with a gNB) are mapped to the learning labels (e.g., best initial access information, such as best PCID, best beam index to be used, signal strength measurement of a Tx/Rx beam, beam configuration, best transmission path, an absolute radio-frequency channel number (ARFCN), etc.). Since the machine learning model 214 is trained periodically, so if the base station (e.g., a gNB) configuration is changed (e.g., a new sector or gNB is added or the PCID, ARFCN is changed), the machine learning model 214 quickly adapts to the change. The processor 202 is further configured to cause the machine learning model 214 to assign more weight to recent data points using, for example, an exponential time decay process. In an example, the hyperparameters of the machine learning model 214 may be set and tuned depending on the formulated rules and boundaries or limits observed based on some early training. The machine learning model 214 may be a learned model that is generated as an output in the training process, and thus, over a period of time, the machine learning model 214 is able to predict the specific initial access information most suited for a given set of input features. Alternatively, in another implementation, a convolutional neural network (CNN) may be used for deep learning, where the input features of the sensing information 208 and the position information 212 and their relationship with the desired output values may be derived automatically. Thus, at the end of the training phase, the connectivity enhanced database 216 is generated that specifies the plurality of uplink and downlink beam alignment-wireless connectivity relationships for each of the plurality of geographical areas along the first travel path for the different service providers. The plurality of uplink and downlink beam alignment-wireless connectivity relationships may be time-of-day specific uplink and downlink beam alignment-wireless connectivity relationships for the plurality of different WCNs 110. Thus, the connectivity enhanced database 216 is obtained, which is used in the inference phase to execute various functions for high-speed low-latency wireless connectivity for various mobility applications.

In accordance with an embodiment, the processor 202 of the central cloud server 102 may be further configured to distribute a subset of information (i.e., a different subset of information) from the generated connectivity enhanced database 216 to each of the plurality of inference servers 118 according to a corresponding geographical zone of the plurality of different geographical zones served by each of the plurality of inference servers 118. The plurality of inference servers 118 may be distributed across the plurality of different geographical zones and act as endpoints of the central cloud server 102. Each inference server of the plurality of inference servers 118 may be configured to serve a defined number of base stations of the plurality of base stations 108, a defined number of edge devices of the plurality of edge devices 104 that includes the first type of edge devices 104A (e.g., one or more edge devices arranged at each vehicle) and the second type of edge devices 104B, for example, a defined number of RSU devices of the plurality of RSU devices 114.

In some implementations, the machine learning model 214 may be deployed on several machine learning endpoints as the plurality of inference servers 118 in multiple geographical zones. In an exemplary implementation, the machine learning model 214 may be deployed on several machine learning endpoints using "AWS Sagemaker" endpoints. Each inference server, such as the inference server 118A, may periodically receive real-time requests from all the edge devices (e.g., the one or more edge devices arranged at each vehicle or the defined number of RSU devices) within its geographical zone. These requests may include the input features (such as a location, a time-of-day, an accelerometer reading, a moving direction of a vehicle, a weather condition, etc.). The relevant inference server may be configured to processes these requests within a few milliseconds and returns a response that includes the best initial access information (e.g., a best donor beam index, a best service beam index, a best beam configuration, a specific ARFCN, a specific PCID, etc.) back to a requesting edge device.

In accordance with an embodiment, the different subset of information from the generated connectivity enhanced database 216 may cause each of the plurality of inference servers 118 to service edge devices of the plurality of edge devices 104 of its corresponding geographical zone independent of the plurality of different WCNs 110 and bypassing an initial access-search on the corresponding edge device. In the inference phase or the operational phase, whenever one or more new vehicles arrive in a later stage, instead of conducting an initial access-search on an edge device of each of the one or more new vehicles, the central cloud server 102 assists the edge device by providing them with optimized initial access information (e.g., best beam index, best beam configuration, best ARFCN, and PCID) that it has learned the machine learning model 214 during the training phase. Moreover, as the different subset of information from the connectivity enhanced database 216 is distributed in advance to each of the plurality of inference servers 118, each of the edge devices of the plurality of edge devices 104 may request its corresponding inference server and receive a response in a few milliseconds to identify the optimized initial access information much faster than standard initial access procedure. Such subset of information is updated in real-time or near time whenever there is a change in the surrounding environment that may potentially affect signal propagation from the one or more fixed network nodes, such as one or more base stations or the second type of edge devices 104B, such as the one or more RSU devices, to the first type of edge devices 104A, such as the one or more edge devices arranged at each vehicle.

Thus, in the inference phase, the processor 202 may be further configured to cause one or more RSU devices of the plurality of RSU devices 114 over a second period of time to direct one or more specific beams of radio frequency (RF) signals to service the donor side of a first edge device (e.g., the edge device 112N) of a new vehicle (e.g., the vehicle 116N) when the new vehicle (e.g., the vehicle 116N) arrives and moves along one or more first geographical areas of the plurality of geographical areas along the first travel path and when the new vehicle (e.g., the vehicle 116N) is also designated as the known user. The one or more specific beams may be selected based on the connectivity enhanced database 216 bypassing an initial access-search on the first edge device (e.g., the edge device 112N) of the new vehicle (e.g., the vehicle 116N) as well as the one or more RSU devices, such as the RSU device 114N.

The new vehicle (e.g., the vehicle 116N) may be designated as the known user based on at least one of an application installed either in the new vehicle or a UE which is in the new vehicle, an authentication key, or a registered gesture. In an example, the application may be installed in a smartphone connected to an in-vehicle infotainment system of the new vehicle or the application may be preinstalled in the vehicle (e.g., in the in-vehicle infotainment system). A unique identity, for example, in the form of the authentication key, or the registered gesture, or other identifying means may be used to identify the new vehicle or the one or more edge devices of the vehicle as the known and valid user to receive services of the central cloud server 102 and other edge devices of the plurality of edge devices 104.

In an example, in a geographical zone (e.g., a part of a city or a city itself depending on population density to service), there may be thousands of edge devices, where each edge device may only require enhanced information of its surrounding area to execute high-performance communication, for example, in order to increase data throughput (e.g., in multi-gigabit data rate), optimize signal propagation paths in uplink and downlink communication, reduce latency, handle heterogeneity and multiple WCNs, and improve QoE. Thus, the processor 202 of the central cloud server 102 (or a respective inference server, such as the inference server 118A) sends wireless connectivity enhanced information from the connectivity enhanced database 216 that includes specific initial access information to cause the one or more RSU devices of the plurality of RSU devices 114 to direct one or more specific beams of radio frequency (RF) signals to service the donor side of the first edge device (e.g., the edge device 112N) of a new vehicle (e.g., the vehicle 116N) when the new vehicle (e.g., the vehicle 116N) arrives and moves along one or more first geographical areas of the plurality of geographical areas along the first travel path.

In accordance with an embodiment, the service side of each edge device (e.g., the edge devices 112A and 112B) that faces the interior of each vehicle to service the one or more UEs 106 within each vehicle of the plurality of vehicles 116 may be configured to select one or more beamforming schemes to illuminate space inside each vehicle of the plurality of vehicles 116 such that both an uplink and a downlink communication is established for the one or more UEs 106 via the one or more edge devices arranged in each vehicle. The one or more beamforming schemes may be selected based on the received wireless connectivity enhanced or based on defined settings at each device (e.g., the edge devices 112A and 112B) of each vehicle.

In an implementation, the processor 202 of the central cloud server 102 (or a respective inference server, such as the inference server 118A) sends wireless connectivity enhanced information from the connectivity enhanced database 216 that includes specific initial access information directly to the donor side of the first edge device (e.g., the edge device 112N) of the new vehicle (e.g., the vehicle 116N) when the new vehicle (e.g., the vehicle 116N) arrives and moves along one or more first geographical areas of the plurality of geographical areas along the first travel path. Such communication of the wireless connectivity enhanced information directly to the donor side of the first edge device (e.g., the edge device 112N) of the new vehicle (e.g., the vehicle 116N) may be done when the received input features from the first edge device (e.g., the edge device 112N) indicates that signal propagation is favorable for direct communication for the received set of input features for travel within the one or more second geographical areas of the plurality of geographical areas along the first travel path, and the first edge device may directly attach to a new gNB without the need of an RSU device.

In accordance with an embodiment, each of the plurality of inference servers 118 may be configured to receive a real-time or a near real-time request from an edge device of a plurality of edge devices 104 within its geographical zone. The plurality of edge devices 104 corresponds to the plurality of RSU devices 114 and the one or more edge devices arranged on each vehicle of the plurality of vehicles 116 and the new vehicle. In an implementation, a first inference server, such as the inference server 118A, of the plurality of inference servers 118 may be configured to receive a real-time or a near real-time request from each of the one or more RSU devices. The real-time or the near real-time request may comprise one or more input features corresponding to the sensing information 208 from the new vehicle. The first inference server, such as the inference server 118A, of the plurality of inference servers 118 may be further configured to communicate a response within less than a specified threshold time to each of the one or more RSU devices. The response may comprise wireless connectivity enhanced information including specific initial access information to each of the one or more RSU devices to bypass the initial access-search on the one or more RSU devices as well as the first edge device, such as the edge device 112N, of the new vehicle (e.g., the vehicle 116N).

In accordance with an embodiment, the processor 202 may be further configured to determine, based on a position of each of the plurality of RSU devices 114, whether a handover is required, and if so communicate wireless connectivity enhanced information including a specific initial access information to the one or more RSU devices so as to cause the one or more RSU devices of the plurality of RSU devices 114 to direct the one or more specific beams of RF signals to service the donor side of the first edge device, such as the edge device 112N, of the new vehicle (e.g., the vehicle 116N). The processor 202 may be further configured to communicate the wireless connectivity enhanced information directly to each of the one or more RSU devices or indirectly via the first inference server (e.g., the inference server 118A) serving a geographical zone encompassing at least the one or more first geographical areas of the plurality of geographical areas along the first travel path.

In accordance with an embodiment, the processor 202 may be further configured to determine that no handover is required for one or more other RSU devices of the plurality of RSU devices 114 when a performance state of cellular connectivity of the first edge device, such as the edge device 112N, of the new vehicle (e.g., the vehicle 116N) is greater than a threshold performance value.

In accordance with an embodiment, the processor 202 may be further configured to determine, based on a position of the first edge device (e.g., the edge device 112N) of the new vehicle (e.g., the vehicle 116N) in motion, whether a handover is required, and if so communicate wireless connectivity enhanced information including specific initial access information to the first edge device (e.g., the edge device 112N) of the new vehicle (e.g., the vehicle 116N) so as to cause the donor side of the first edge device to attach to a new base station (e.g., a new gNB) directly or via the one or more RSUs. In such a case, the processor 202 may be further configured to communicate the wireless connectivity enhanced information directly to the first edge device (e.g., the edge device 112N) of the new vehicle (e.g., the vehicle 116N) or indirectly via the first inference server (e.g., the inference server 118A) serving a geographical zone encompassing at least the one or more first geographical areas of the plurality of geographical areas along the first travel path.

In a case where a wireless connection (e.g., a cellular connectivity) of the first edge device, such as the edge device 112N, of the new vehicle (e.g., the vehicle 116N) that is in motion is about to become less than a threshold performance value, such potential performance drop proactively may be predicted by the central cloud server 102 based on new sensing information received from the first edge device, such as the edge device 112N, itself or from one or more RSU devices in the vicinity of the first edge device. For example, the first edge device, such as the edge device 112N, of the new vehicle (e.g., the vehicle 116N) may be attached to the first base station 108A (or the RSU device 114A), and as the new vehicle moves, the distance from the first base station 108A (or the RSU device 114A) may increase, and the signal strength may gradually decrease. Thus, based on input features obtained from the new sensing information, such as a moving direction of the new vehicle, a position of the new vehicle, a distance from one or more RSU devices in the vicinity of the new vehicle, a current weather condition, the location of the reflective objects around the first edge device of the new vehicle, and an overall 3D environment representation around the new vehicle, the processor 202 determines that a handover is required to maintain QoE, and accordingly performs either a first operation or a second operation based on input features obtained from the new sensing information. In a case where the input features are communicated to a given inference server deployed within a geographical zone, then the given inference server (e.g., the inference server 118A) may be configured to determine the decision of the handover and performs either the first operation or the second operation instead of the central cloud server 102. In the first operation, the processor 202 (or the given inference server) may select a suitable RSU device (e.g., the RSU device 114B) among the plurality of RSU devices 114 and communicates wireless connectivity enhanced information to such selected RSU device so that there is no need to perform beam sweeping operation or standard initial access search on such RSU device as well as the first edge device of the new vehicle. Thus, the first edge device of the new vehicle (e.g., the vehicle 116N) may readily connect to the selected RSU device (e.g., the RSU device 114B) and continue to perform uplink and downlink communication with high throughput without any interruptions. In the second operation, based on the input features, the processor 202 (or the given inference server) may directly communicate the wireless connectivity enhanced information specific to the donor side of the first edge device, such as the edge device 112N, of the new vehicle (e.g., the vehicle 116N) so that there is no need to perform beam sweeping operation or standard initial access search on such first edge device. In such a case, the first edge device, such as the edge device 112N, of the new vehicle may attach to a new gNB as specified in the provided initial access information with significantly reduced latency. Similarly, in accordance with an embodiment, the processor 202 (or the given inference server) may be further configured to determine that no handover is required for the first edge device based on the input features (e.g., current and upcoming locations, the moving direction, one or more upcoming geographical areas of the first travel path) which may indicate that a performance state of a wireless connection of the first edge device of the new vehicle will be greater than a threshold performance value for the one or more upcoming geographical areas that will be traversed by the new vehicle in the first travel path.

In an example, the central cloud server 102 by use of the connectivity enhanced database 216 and the machine learning model 214, and based on the distribution of the different subset of information from the connectivity enhanced database 216 to each of the plurality of inference servers 118 according to a corresponding position of the each of the plurality of inference servers 118, further achieves the following:

(a) reduce time to align to a timing offset of a beam reception at an edge device to a frame structure of a 5G NR radio frame, and allows uplink and downlink to use complete 5G NR frequency spectrum, but in different time slots, where some short time slots are designated for uplink while other time slots are designated for downlink;

(b) perform coordination among the edge devices of the plurality of edge devices 104 for beamforming optimizations for enhanced network coverage and quality of service (QoS);

(c) remotely control the phase-shifting by controlling the adjustment in phase values of the input RF signals till the combined signal strength value of the received input RF signals is maximized to design beams in the inference phase;

(d) control amplification of input RF signals, which may have low-power, without significantly degrading corresponding signal-to-noise (SNR) ratio in the inference phase;

(e) send control signals to remotely configure or control parameters (e.g., amplifier gains and phase responses) associated with the one or more first antenna arrays or the one or more second antenna arrays;

(f) configure and control and adjust beam patterns to and from each of the plurality of edge devices 104;

(g) remotely configure dynamic partitioning of a plurality of antenna elements of an antenna array into a plurality of spatially separated antenna sub-arrays to generate multiple beams in different directions at the same time or in different time slots;

(h) configure and instruct an edge device for a suitable adjustment of a power back-off to minimize (i.e., substantially reduce) the impact of interference (echo or noise signals) and hence only use as much power as needed to achieve low error communication with one or more base stations in the uplink or the one or more UEs 106 in the downlink communication; and (i) optimize blocks of radio and perform Radio access network optimization to improve coverage, capacity, and service quality of different geographical areas.

In accordance with an alternative embodiment, in the training phase, the central cloud server 102 may be further configured to cause one or more edge devices (e.g., the RSU 114A) of the second type of edge devices 104B to dynamically partition one or more antenna arrays at a service side into a plurality of sub-arrays of antenna elements. Such partitioning may be a logical partitioning done at corresponding edge device done based on the wireless connectivity enhanced information obtained from the central cloud server 102. The plurality of sub-arrays of antenna elements of a given antenna array of the one or more antenna arrays may be configured to establish independent communication channels with other edge devices, such as the one or more edge devices, arranged at the plurality of vehicles 116. Based on the feedback received, for example, from the processing chain parameters 210, the locations (or traffic information) of geographical areas of the first travel path where such dynamic partitioning was found be useful in provisioning of QoE, may be stored for later use in the inference phase. Thus, in the inference phase, when multiple vehicles arrive to such locations of same geographical areas of the first travel path, a given edge device (e.g., the RSU 114A) of the second type of edge devices 104B may be configured to dynamically partition one or more antenna arrays at the service side into the plurality of sub-arrays of antenna elements to establish independent communication channels with multiple vehicles at the same time. The central cloud server 102 (or one of the plurality of inference servers 118) may be configured to determine that a handover is required, and may be communicate, to the given edge device (e.g., the RSU 114A), wireless connectivity enhanced information that includes specific initial access information along with the instruction for dynamic partitioning to establish independent channels with multiple vehicles. Similarly, the central cloud server 102 may be further configured to cause one or more edge devices (e.g., the edge device 112A) of the first type of edge devices 104A arranged at a given vehicle (e.g., the vehicle 116A) to dynamically partition one or more antenna arrays at its service side into a plurality of sub-arrays of antenna elements to establish independent communication channels with multiple UEs, such as the first UE 106A and the second UE 106B present in the given vehicle.

FIG. 3 is a block diagram illustrating components of an exemplary RSU device, in accordance with an embodiment of the disclosure. FIG. 3 is explained in conjunction with elements from FIGS. 1 and 2. With reference to FIG. 3, there is shown a block diagram 300 of an RSU device, such as the RSU device 114A. The RSU device 114A has a donor side 302A facing towards the plurality of base stations 108, such as the first base station 108A and the second base station 108B (of FIG. 1). The RSU device 114A also has a service side 302B facing towards one or more vehicles of the plurality of vehicles 116 and one or more UEs 106, such as the first UE 106A and the second UE 106B. In an implementation, the RSU device 114A may include a control section 304 and a front-end radio frequency (RF) section, which may include one or more first antenna arrays 306 and an uplink chain 308 at the donor side 302A, and further one or more second antenna arrays 310 and a downlink chain 312 at the service side 302B. The control section 304 may be communicatively coupled to the front-end RF section, such as the one or more first antenna arrays 306, the uplink chain 308, the one or more second antenna arrays 310, and the downlink chain 312. The front-end RF section supports millimeter-wave (mmWave) communication as well communication at a sub 6 gigahertz (GHz) frequency. The control section 304 may further include control circuitry 314, a memory 316, and one or more filters 318.

The RSU device 114A is one of the second type of edge devices 104B and is deployed at a fixed location. The RSU device 114A includes suitable logic, circuitry, and interfaces that may be configured to communicate with one or more base stations of the plurality of base stations 108, one or more edge devices of a vehicle, and an inference server, such as the inference server 118A, which is configured to serve a geographical zone within which the RSU device 114A is located. The RSU device 114A may be further configured to communicate with the one or more UEs 106 and other RSU devices of the plurality of RSU devices 114. In accordance with an embodiment, the RSU device 114A may support multiple and a wide range of frequency spectrum, for example, 2G, 3G, 4G, 5G, and 6G (including out-of-band frequencies). The RSU device 114A may be one of an XG-enabled edge communication device, an XG-enabled edge repeater device, an XG-enabled relay device, an XG-enabled customer premise equipment (CPE), an XG-enabled small cell deployed at a fixed location, where the term "XG" refers to 5G or 6G communication. Other examples of the RSU device 114A may include, but is not limited to, a 5G wireless access point, an evolved-universal terrestrial radio access-new radio (NR) dual connectivity (EN-DC) device, a Multiple-input and multiple-output (MIMO)-capable repeater device, or a combination thereof deployed at a fixed location.

The one or more first antenna arrays 306 may be provided at the donor side 302A, and may be communicatively coupled to the uplink chain 308. The one or more second antenna arrays 310 may be provided at the service side 302B and may be communicatively coupled to the downlink chain 312. Each of the uplink chain 308 and the downlink chain 312 may include a transceiver chain, for example, a cascading receiver chain and a cascading transmitter chain, each of which comprises various components for baseband signal processing or digital signal processing. For example, the cascading receiver chain may comprise various components, such as a set of low noise amplifiers (LNA), a set of receiver front end phase shifters, and a set of power combiners, for the signal reception (not shown here for brevity). Similarly, the cascading transmitter chain may comprise various components for baseband signal processing or digital signal processing, such as a set of power dividers, a set of phase shifters, a set of power amplifiers (PA).

In an implementation, the one or more second antenna arrays 310 at the service side 302B supports multiple-input multiple-output (MIMO) operations and may be configured to execute MIMO communication with the one or more edge devices of a vehicle (or directly with the one or more UEs 106) within its communication range. The MIMO communication may be executed at a sub 6 gigahertz (GHz) frequency or at mmWave frequency for 5G NR communication. Each of the one or more first antenna arrays 306 and the one or more second antenna arrays 310 may be one of an XG phased-array antenna panel, an XG-enabled antenna chipset, an XG-enabled patch antenna array, or an XG-enabled servo-driven antenna array, where the "XG" refers to 5G or 6G. Examples of implementations of the XG phased-array antenna panel include, but are not limited to, a linear phased array antenna, a planar phased array antenna, a frequency scanning phased array antenna, a dynamic phased array antenna, and a passive phased array antenna.

The control circuitry 314 may be communicatively coupled to the memory 316, the one or more filters 318, and the front-end RF section. The control circuitry 314 may be configured to execute various operations of the RSU device 114A. The control circuitry 314 may be configured to control various components of the front-end RF section, such as the one or more first antenna arrays 306 and the uplink chain 308 at the donor side 302A; and the one or more second antenna arrays 310 and the downlink chain 312 at the service side 302B. The RSU device 114A may be a programmable device, where the control circuitry 314 may execute instructions stored in the memory 316. Example of the implementation of the control circuitry 314 may include but are not limited to an embedded processor, a baseband processor, a Field Programmable Gate Array (FPGA), a microcontroller, a specialized digital signal processor (DSP), a control chip, a Reduced Instruction Set Computing (RISC) processor, an Application-Specific Integrated Circuit (ASIC) processor, a Complex Instruction Set Computing (CISC) processor, and/or other processors, or state machines.

The memory 316 may be configured to store wireless connectivity enhanced information for one or more edge devices arranged on a vehicle or for the one or more UEs, such as the first UE 106A and the second UE 106B, obtained from the central cloud server 102 or the inference server (e.g., the inference server 118A). The memory 316 may be further configured store values calculated by the control circuitry 314. Examples of the implementation of the memory 316 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read-only memory (ROM), a hard disk drive (HDD), a secure digital (SD) card, a flash drive, cache memory, and/or other non-volatile memory. It is to be understood by a person having ordinary skill in the art that the control section 304 may further include one or more other components, such as an analog to digital converter (ADC), a digital to analog (DAC) converter, a cellular modem, and the like, known in the art, which are omitted for brevity.

The one or more filters 318 may be a band-pass filter, a multi-band filter or other channel select filter. The one or more filters 318 may be used to allow or reject one or more bandwidth parts (BWPs) of one or more NR frequency bands in an uplink and a downlink direction using the one or more filters 318.

In operation, the control circuitry 314 may be configured to receive a first connection request from a vehicle 116N as the vehicle 116N moves along a first travel path. The vehicle 116N may comprise one or more edge devices (e.g., the edge devices 112A and 112B) arranged such that a donor side of each edge device faces an exterior of the vehicle 116N to communicate with one or more network nodes and a service side of each edge device faces an interior of the vehicle 116N to service the one or more UEs 106 within the vehicle 116N. At least the first UE 106A of the one or more UEs 106 may comprise an application that causes the first UE 106A and the vehicle 116N to be designated as a known user to the RSU device 114A. The first travel path may share a plurality of geographical areas that remain covered by a coverage area of one base station, uncovered by any base station, or partially or mutually covered by the plurality of base stations 108 of different service providers, such as the plurality of different WCNs 110.

The control circuitry 314 may be further configured to communicate a request to a first inference server (such as the inference server 118A) of the plurality of inference servers 118 based on the received first connection request. The request may comprise one or more input features corresponding to sensing information 208 from the vehicle 116N. The request may be made by an out-of-band or an in-band communication. The control circuitry 314 may be further configured to receive a response within less than a specified threshold time from the first inference server (such as the inference server 118A). The response may comprise wireless connectivity enhanced information, including specific initial access information to bypass an initial access-search on the RSU device 114A. At the end of training phase, each of the plurality of inference servers 118 obtains a subset of information from the connectivity enhanced database 216 according to a corresponding geographical zone of the plurality of different geographical zones served by each of the plurality of inference servers 118. The first inference server (such as the inference server 118A) utilizes such subset of information that acts like learned database specific to the geographical zone to be served by the first inference server (such as the inference server 118A), to extract the wireless connectivity enhanced information, including specific initial access information, and communicate as the response to the RSU device 114A. The control circuitry 314 may be further configured to direct one or more specific beams of radio frequency (RF) signals to service the donor side of a first edge device (e.g., the edge device 112A) of the one or more edge devices of the vehicle 116N that is designated as the known user when the vehicle 116N arrives and moves along one or more first geographical areas of the plurality of geographical areas along the first travel path based on the wireless connectivity enhanced information received in the response. The first edge device (e.g., the edge device 112A) may be further configured to service the one or more user UEs 106, such as the first UE 106A and the second UE 106B within the vehicle 116N. In an example, the first edge device (e.g., the edge device 112A) may be further configured to select a beamforming scheme to illuminate space inside the vehicle 116N such that both an uplink and a downlink communication is established for the first UE 106A and the second UE 16B via the first edge device (e.g., the edge device 112A) arranged on the vehicle 116N.

In an exemplary implementation, the wireless connectivity enhanced information, may include a set of initial access information specific to the RSU device 114A as well as other nodes in a communication path till it reaches an end-user device. For example, the wireless connectivity enhanced information may include a first initial access information specific to RSU device 114A, a second initial access information specific to the first edge device (e.g., the edge device 112A) of the one or more edge devices of the vehicle 116N, and a third initial access information specific to one or more UEs 106 present in the vehicle 116N to establish low-latency and high-speed end-to-end communication.

Figure 4A:
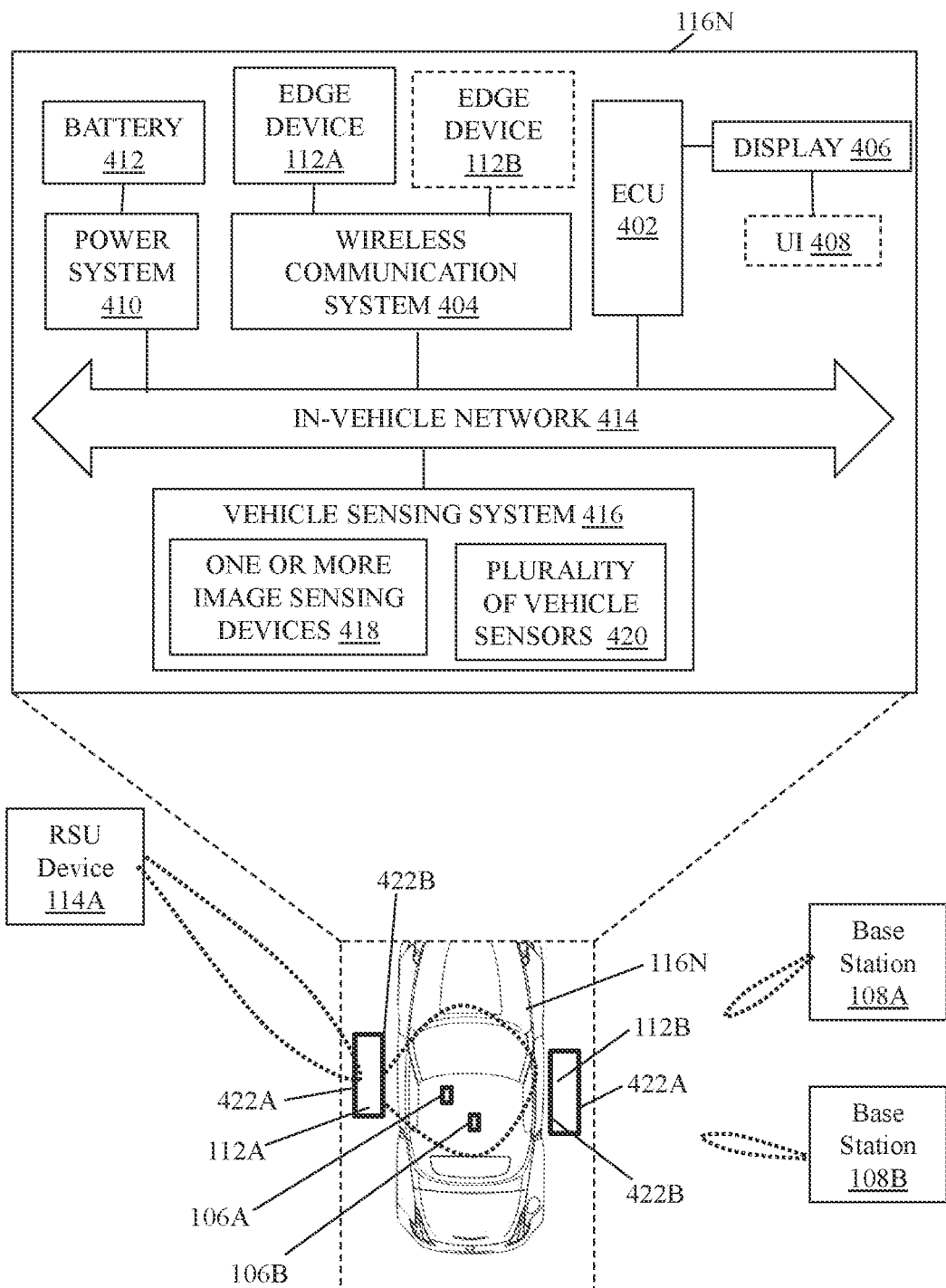
FIG. 4A is an illustration that depicts an exemplary arrangement of one or more edge devices on a vehicle with exemplary components, in accordance with an embodiment of the disclosure.

FIG. 4A is an illustration that depicts an exemplary arrangement of one or more edge devices on a vehicle with exemplary components, in accordance with an embodiment of the disclosure. FIG. 4A is explained in conjunction with elements from FIGS. 1, 2, and 3. With reference to FIG. 4A, there is shown the vehicle 116N with the edge devices 112A and the 112B, the RSU device 114A, the first base station 108A and the second base station 108B. The vehicle 116N may include an electronic control unit (ECU) 402 and a wireless communication system 404 coupled to the one or more edge devices, such as the edge devices 112A and the 112B, arranged at the vehicle 116N. There is further shown a display 406, a user interface 408, a power system 410, a battery 412, an in-vehicle network 414, and a vehicle sensing system 416 that may include one or more image sensing devices 418 and a plurality of vehicle sensors 420.

In some implementations, two edge devices, such as the edge devices 112A and 112B, may be arranged at the vehicle 116N. In such a case, the edge devices 112A and 112B may be arranged at different positions on the vehicle 116N. In an example, the edge device 112A may be arranged at the front of the vehicle 116N, whereas the edge device 112B may be arranged at the rear of the vehicle 116N. The front and rear may be ascertained based on a driving area and rear passenger area, respectively. In another example, the edge device 112A may be arranged at a first side (e.g., a left door side) of the vehicle 116N, whereas the edge device 112B may be arranged at a second side (e.g., a right door side) opposite to the first side of the vehicle 116N, as shown. The left and right of the vehicle 116N may be ascertained from a perspective of a user standing at the rear of the vehicle 116N and viewing the vehicle 116N from the rear side while the vehicle 116N may be moving ahead and away from the user.

In some implementations, one edge device, such as the edge device 112A, may be arranged at a given vehicle, such as the vehicle 116N. For example, the edge device 112A may be arranged at a roof panel of the vehicle 116N such that its donor side 422A faces an exterior of the vehicle 116N to communicate with the first base station 108A and/or the second base station 108B directly or via the RSU device 114A. In such a case, in an example, the donor side 422A of the edge device 112A may be configured to receive RF signals from multiple directions, i.e., approximately 360-degree signal reception capability. A service side 422B of the edge device 112A may be arranged to service components of the vehicle 116N and UEs, such as the first UE 106A and the second UE 106B associated with the vehicle 116N. The components of the vehicle 116N, which may be serviced, for example, include the wireless communication system 404 to establish and maintain wireless connectivity for data communication to and from the vehicle 116N. In some implementations, one or more edge devices, such as the edge devices 112A and 112B, maybe a part of a telematics unit (i.e., the wireless communication system 404) of the vehicle 116N. In yet another example, one or more edge devices, such as the edge devices 112A and 112B, may be adapted to form a housing of the side mirrors of the vehicle 116N. It is to be understood to a person of ordinary skill in the art that there may be more than one or two edge devices and their arrangement at the vehicle 116N may vary as long as such edge devices are able to receive and transmit RF signals to the one or more network nodes, such as one or more base stations (e.g., the first base station 108A or the second base station 108B) and one or more RSU devices (e.g., the RSU device 114A).

The ECU 402 may comprise suitable logic, circuitry, interfaces, and/or instructions that may be configured to execute operations for acquiring and processing sensor data captured by the vehicle sensing system 416. The various components or systems of the vehicle 116N may be communicatively coupled to each other via the in-vehicle network 414, such as a vehicle area network (VAN), and/or an in-vehicle data bus. The wireless communication system 404 may include or may be communicatively coupled with the edge devices 112A and 112B to communicate with one or more external communication devices, such as the central cloud server 102, one or more inference servers of the plurality of inference servers 118, one or more other network nodes (e.g., RSU devices and base stations), and one or more other vehicles. The display 406 may be communicatively coupled to the ECU 402 and may be a display of an infotainment head unit, which may render the UI 408 configured to receive an input from a user to activate the one or more edge devices, such as the edge devices 112A and 112B. Other examples of the display 406 may include, but are not limited to, a heads-up display (HUD), a driver information console (DIC), a smart-glass display, and/or an electrochromic display. The power system 410 may be configured to measure and regulate the availability and distribution of uninterrupted power from the battery 412 to various electric circuits and loads of the first vehicle 702, for example, the edge devices 112A and 112B.

The vehicle sensing system 416 may comprise the one or more image sensing device 418 and the plurality of vehicle sensors 420 installed at the vehicle 116N. The one or more image sensing device 418 may be configured to capture a field-of-view (FOV) of a surrounding area of the vehicle 116N. Examples of the plurality of vehicle sensors 420 may include, but may not be limited to, a vehicle speed sensor, an odometer, a yaw rate sensor, a speedometer, a Global Navigation Satellite System (GNSS) receiver (e.g., a GPS), a steering angle detection sensor, a vehicle motion direction detection sensor, a magnetometer, an infrared sensor, a radio wave-based object detection sensor, and/or a laser-based object detection sensor. The plurality of vehicle sensors 420 may be configured to further detect a direction of travel, geospatial position, steering angle, yaw rate, speed, and/or a rate-of-change of speed of the vehicle 116N.

In operation, in the training phase, the one or more edge devices, such as the edge devices 112A and 112B, may be configured to capture sensing information of a surrounding of the vehicle 116N. The one or more edge devices, such as the edge devices 112A and 112B, may be configured to utilize the vehicle sensing system 416 to acquire sensor data and communicate as such the sensor data as the sensing information 208 to the central cloud server 102. In an implementation, the one or more edge devices, such as the edge devices 112A and 112B, may be configured to selectively filter such sensor data from the vehicle sensing system 416 to extract relevant features as the sensing information 208 before sending to the central cloud server 102 in the training phase. For example, features such as a location of a vehicle, a moving direction, a travel path, speedometer readings or a rate of change of speed, an orientation, a time-of-day, traffic light information, nearby bridges, weather information, a presence of reflective objects, etc., may be extracted from the sensor data of the vehicle sensing system 416 and periodically communicated as the sensing information 208 to the central cloud server 102. The one or more edge devices, such as the edge devices 112A and 112B, may be further configured to periodically communicate the processing chain parameters 210 to the central cloud server 102. All such measurements and feedback are sent to the central cloud server 102 for learning. The sensing information 208, the processing chain parameters 210 of the edge devices 112A and 112B, and the position information 212 associated with the vehicle 116N and other vehicles of the plurality of vehicles 116 may be correlated by the central cloud server 102 to generate the connectivity enhanced database 216 holistically for the plurality of different WCNs 110.

In the inference phase, the one or more edge devices, such as the edge devices 112A and 112B, may be configured to receive an activation request to activate the one or more edge devices. The request may be received from the first UE 106A or via the in-vehicle network 414 based on input via the UI 408. The activation request may be received via an out-of-band communication, such as Wi-Fi, Bluetooth, a personal area network (PAN) connection, or via the in-vehicle network 414. The one or more edge devices, such as the edge devices 112A and 112B, may be further configured to communicate new sensing information to the inference server 118A of the plurality of inference servers 118 (or to the central cloud server 102). Due to the awareness of a physical location of the one or more edge devices, such as the edge devices 112A and 112B, and the new sensing information (most recent), the inference server 118A may be configured to transmit wireless connectivity enhanced information that includes specific initial access information to the one or more edge devices, such as the edge devices 112A and 112B. The specific initial access information may be used by the one more edge devices, such as the edge devices 112A and 112B, to bypass an initial access search and further switch (i.e., become attached) to the second base station 108B (e.g., a new gNB) directly from the first base station 108A with reduced latency as compared to standard gNB handover time when the vehicle 116N moves along a first geographical area of the plurality of geographical areas along the first travel path. The edge devices 112A and 112B may be communicatively coupled with each other via a communication path which may be wired or wireless. When the vehicle 116N further moves along a second geographical area of the plurality of geographical areas along the first travel path, updated sending information may be communicated to the central cloud server 102 or to the nearest inference server, such as the inference server 118A. The inference server 118A may then communicate updated initial access information to maintain the connectivity to the second base station 108B via the RSU device 114A. The RSU device 114A may be configured to identify the vehicle 116N as a known and valid user and direct a specific beam of radio frequency (RF) signal to service the donor side 422A of the edge device 112A of the vehicle 116N when the vehicle 116N as the vehicle 116N arrives and moves along the second geographical area along the first travel path. The edge device 112A may be configured to receive the specific beam of RF signal from the donor side 422A and relay the beam of RF signal from the service side 422B that faces the interior of the vehicle 116N. The edge device 112A may be further configured to service the one or more user UEs, such as the first UE 106A and the second UE 106B within the vehicle 116N. In an example, the edge device 112A may be configured to select a beamforming scheme to illuminate space inside the vehicle 116N such that both an uplink and a downlink communication is established for the first UE 106A and the second UE 16B via the edge device 112A arranged on the vehicle 116N.

Currently, it is observed that a smartphone battery, such as a battery of the first UE 106A and the second UE 106B, drains faster when it switched from 4G radio access to 5G back and forth. In mobility scenarios, for example, when such UEs, such as the first UE 106A and the second UE 106B, are present in a moving vehicle like the vehicle 116N, the battery of such UEs drains even faster. Thus, in this case, as the UEs are serviced by the edge devices 112A and 112B, present in the vicinity, which in the employ the battery 412 of the vehicle 116N, for its operation, the drainage in the comparatively smaller sized and low-capacity batteries of the UEs is significantly reduced.

In an implementation, as the first travel path is known to the central cloud server 102 and/or the inference server 118A, the central cloud server 102 (or the inference server 118A) may be configured to communicate a set of initial access information in advance to the one or more edge devices, such as the edge devices 112A and 112B. For example, based on learned information (associated with different locations across the plurality of geographical areas of the first travel path) in the connectivity enhanced database 216, the central cloud server 102 (or the inference server 118A) may be further configured to predict that three different initial access information may be required for the first travel path based on the prior knowledge of the first travel path and based on other supplementary information, such as real-time or near real-time traffic information and road information, for example, the location of turns, street cross-sections, an occurrence of any bridge, surrounding buildings that may block signals at certain road portion of the travel path. Thus, accordingly, the central cloud server 102 (or the inference server 118A) may extract such a set of initial access information and communicate to the one or more edge devices, such as the edge devices 112A and 112B. The one or more edge devices, such as the edge devices 112A and 112B, based on its current position in the first travel path, may retrieve corresponding initial access information from the set of initial access information sequentially in accordance with its position and maintain wireless connectivity with multiple handovers (e.g., three handovers in this case). For instance, the vehicle 116N may be move 10 minutes, and then a first initial access information may be triggered for use based on its current position. The vehicle 116N may further move 20 minutes along the first travel path, and then a second initial access information is triggered for use from the set of initial access information. Lastly, a third initial access information is triggered for use at the last 5 minutes of completion of the first travel path based on the updated position of the vehicle 116N. Beneficially, such prediction of multiple handover points in the first travel path and communication of the set of initial access information in advance to the one or more edge devices, such as the edge devices 112A and 112B, significantly increases the reliability and maintains high data throughput rate throughout the first travel path without any adverse interruptions.

In accordance with an embodiment, the central cloud server 102 (or the inference server 118A) may be further configured to detect a deviation from the first travel path and accordingly communicated an updated set of initial access information in advance to the one or more edge devices, such as the edge devices 112A and 112B. In some implementations, the central cloud server 102 (or the inference server 118A) may be further configured to predict that an alternative sub-route may be taken based on a motion pattern of the vehicle 116N (e.g., a driving pattern) and further based on an estimation of a traffic condition, for example, a traffic jam ahead and availability of an alternative route. Thus, accordingly, the updated set of initial access information is sent to the one or more edge devices, such as the edge devices 112A and 112B, to mitigate such deviation.

Figure 4B:
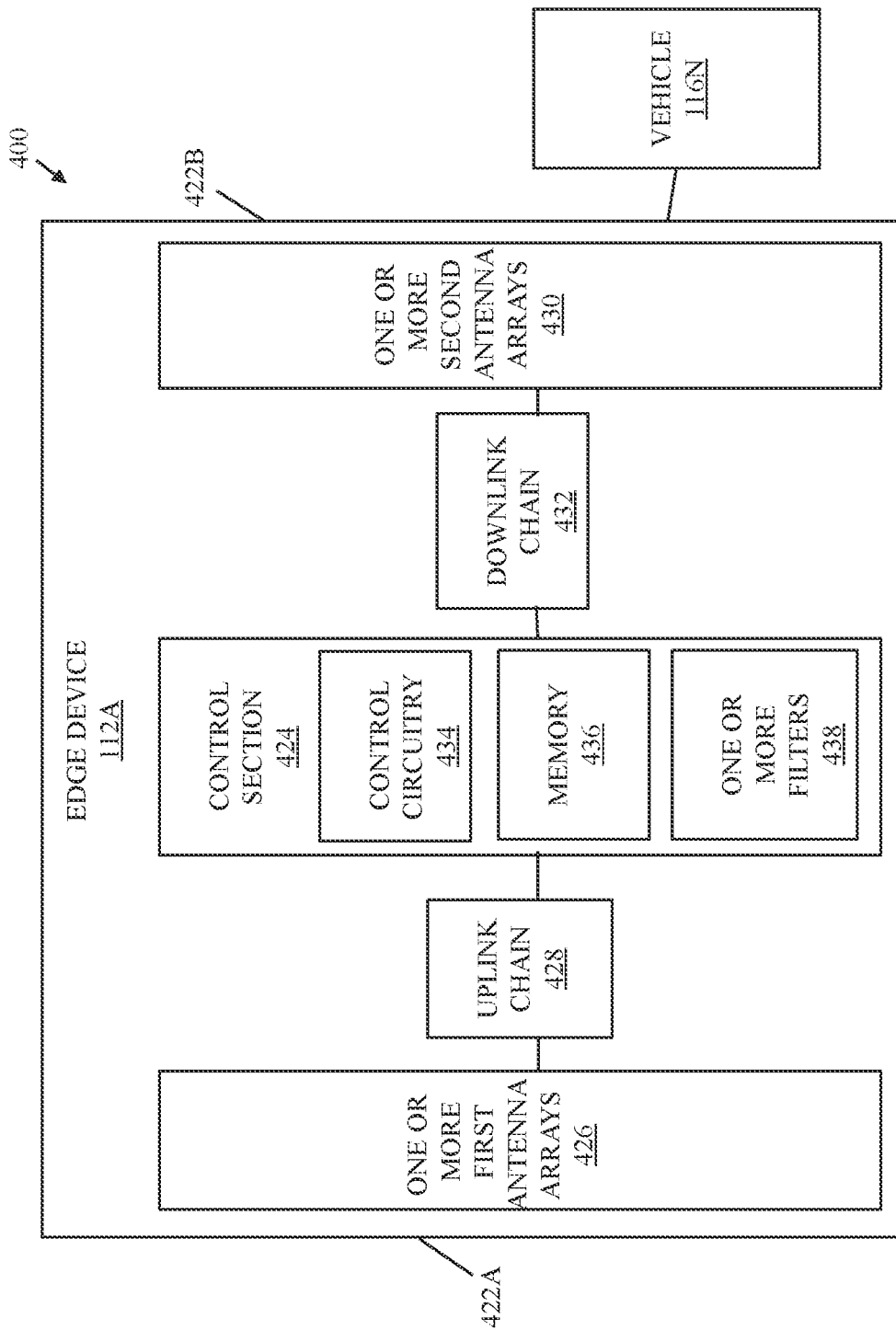
FIG. 4B is a block diagram illustrating components of an exemplary edge device arranged on a vehicle, in accordance with an embodiment of the disclosure.

FIG. 4B is a block diagram illustrating components of an exemplary edge device arranged on a vehicle, in accordance with an embodiment of the disclosure. FIG. 4B is explained in conjunction with elements from FIGS. 1, 2, 3, and 4A. With reference to FIG. 4B, there is shown a block diagram 400 of an edge device, such as the edge device 112A. The edge device 112A has the donor side 422A facing one or network nodes, such as one or more base stations and one or more RSU devices, such as the RSU device 114A. The edge device 112A also has the service side 422B facing towards an interior of the vehicle 116N. The edge device 112B and other edge devices of the first type of edge devices 104A may be similar to that of the edge device 112A. In an implementation, the edge device 112A may include components that are similar to that of the RSU device 114A. For instance, the edge device 112A may include a control section 424 and a front-end radio frequency (RF) section, which may include one or more first antenna arrays 426 and an uplink chain 428 at the donor side 422A, and further one or more second antenna arrays 430 and a downlink chain 432 at the service side 422B. The control section 424 may be communicatively coupled to the front-end RF section, such as the one or more first antenna arrays 426, the uplink chain 428, the one or more second antenna arrays 430, and the downlink chain 432. The front-end RF section supports millimeter-wave (mmWave) communication as well communication at a sub 6 gigahertz (GHz) frequency. The control section 424 may further include control circuitry 434, a memory 436, and one or more filters 438.

The edge device 112A is one of the first type of edge devices 104A, which is a movable device. Thus, the donor side 422A of the edge device 112A is more active in terms of handling handovers and changes in a channel as compared to the service side. Examples of implementation of the components of the edge device 112A may be similar to that of the components of the RSU device 114A.

Figure 5:
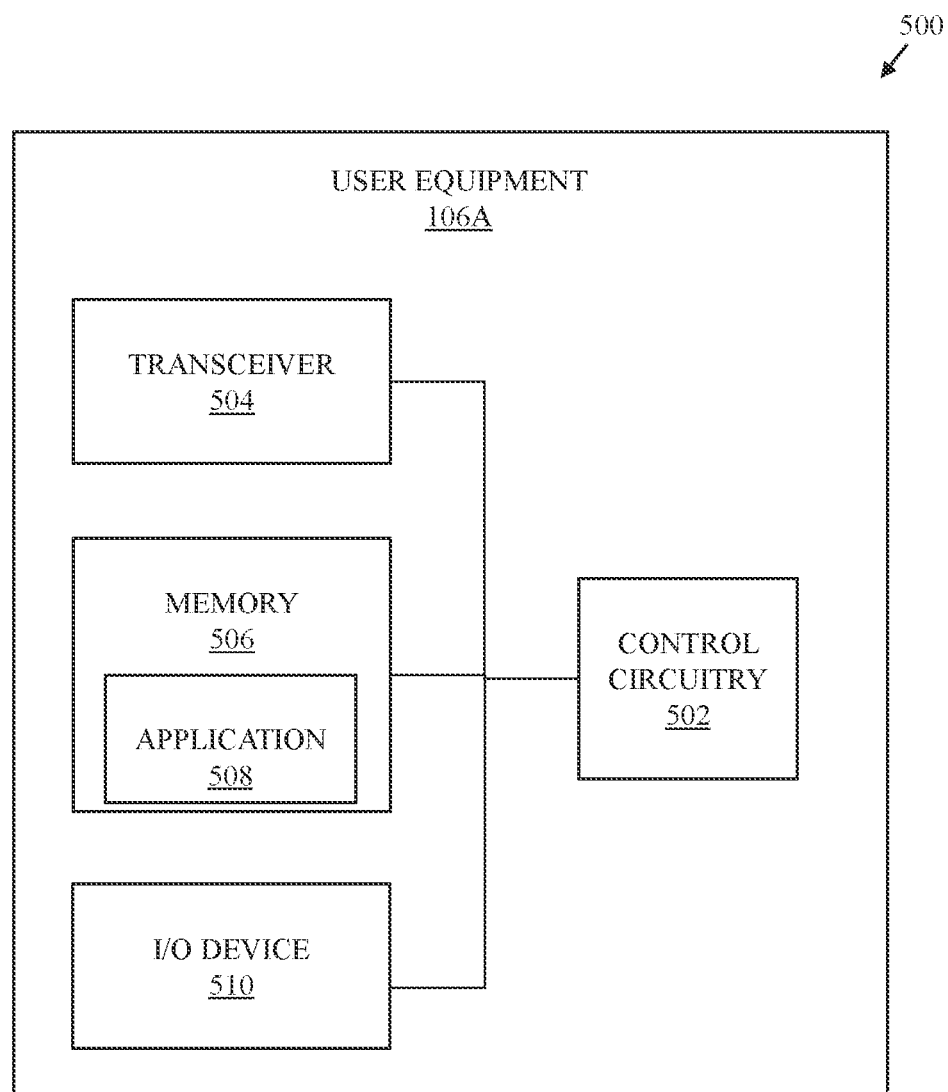
FIG. 5 is a block diagram illustrating components of an exemplary user equipment, in accordance with an embodiment of the disclosure.

FIG. 5 is a block diagram illustrating components of an exemplary user equipment, in accordance with an embodiment of the disclosure. FIG. 5 is explained in conjunction with elements from FIGS. 1, 2, 3, 4A, and 4B. With reference to FIG. 5, there is shown a block diagram 500 of a user equipment (UE), such as the first UE 106A. The first UE 106A may include a control circuitry 502, a transceiver 504, a memory 506, and an Input/Output (I/O) device 510. An application 508 may be installed in the memory 506.

The application 508 causes the first UE 106A to be communicatively coupled to the central cloud server 102 to receive its services. Moreover, a user input, for example, an authentication key or a registered gesture, may be received via the application 508 that is used to verify the identity of the first UE 106A as a known user. In an example, the application 508 may be installed in a smartphone which may be connected to an in-vehicle infotainment system of a vehicle. A unique identity, for example, in the form of the authentication key, or the registered gesture, or other identifying means may be used to identify the vehicle or the one or more edge devices of the vehicle as the known and valid user to receive services of the central cloud server 102 based on the application 508.

In operation, in a first exemplary scenario, the first UE 106A, such as a smartphone, may be subscribed to the first WCN 110A and may be attached to the first base station 108A. The application 508 causes the first UE 106A to be communicatively coupled to the central cloud server 102, which is turn may also assist the first UE 106A to establish a connection with the nearest inference server, such as the inference server 118A, which serves a geographical zone within which the first UE 106A may be currently located. The first UE 106A may move from a first location under a first coverage area of the first base station 108A towards a second location in a travel path, where the second location is within a second coverage area of another base station. As the first UE 106A move towards the second coverage area of the other base station, the control circuitry 502 may be configured to obtain wireless connectivity enhanced information via the transceiver 504 from the central cloud server 102 (or the inference server 118A). The wireless connectivity enhanced information may include a specific initial access information that is most suited for the second location, and such wireless connectivity enhanced information may be received ahead of time before the first UE 106A reaches the second location. The central cloud server 102 (or the inference server 118A) may be configured to identify the first UE 106A as a known and valid user that is authorized to receive services of the central cloud server 102 and/or the inference server 118A based on an input received via the application 508. Based on the specific initial access information (e.g., a new PCID, a new ARFCN, a beam index to indicate an antenna of the transceiver 504 to communicate in a specific direction for a beam from another base station), the control circuitry 502 bypasses the initial access search at the first UE 106A and becomes attached to the other base station (e.g., a new gNB) directly with reduced handover latency. The first UE 106A may further move from the second location to a third location (a next geographical area). Due to the awareness of the changing physical location of the first UE 106A, the central cloud server 102 may be further configured to determine that a handover is required and that no direct connection may be established between the first UE 106A and a base station in the third location (in the next geographical area) of the travel path from the connectivity enhanced database 216. Accordingly, the central cloud server 102 (or the inference server 118A) may be configured to select an edge device of the second type of edge devices 104A, such as the RSU device 114A, and communicate wireless connectivity enhanced information that includes an updated initial access information to the RSU device 114A, which in turn establishes a connection with a suitable base station (based on the updated initial access information) and services the first UE 106A with reduced latency as compared to standard gNB handover time. Thus, arbitration between the central cloud server 102 and the RSU device 114A results in the RSU device 114A, as well as the first UE 106A being alleviated from the complex functions of beam sweeping and handover, thereby simplifying their beamforming design and consequently lowering the cost of infrastructure.

Furthermore, a consumer, such as the first UE 106A, is provided with the capability to choose which WCN (i.e., which service provider) they like to connect to, and this is enabled from the cloud, such as the central cloud server 102. The central cloud server 102 transmits specific initial access information (optimal initial access information) associated with a WCN, such as the first WCN 110A, to the RSU device 114A to establish wireless connectivity with the first UE 106A and a new gNB bypassing conventional initial-access search. Hence, beneficially, a consumer of a UE, such as the first UE 106A, subscribed to the first WCN 110A may receive an RF signal of the first WCN 110A from the RSU device 114A. Alternatively, if the consumer of the first UE 106A is subscribed to the second WCN 110B, then the first UE 106A receives an RF signal of the second WCN 110B.

Figure 6:
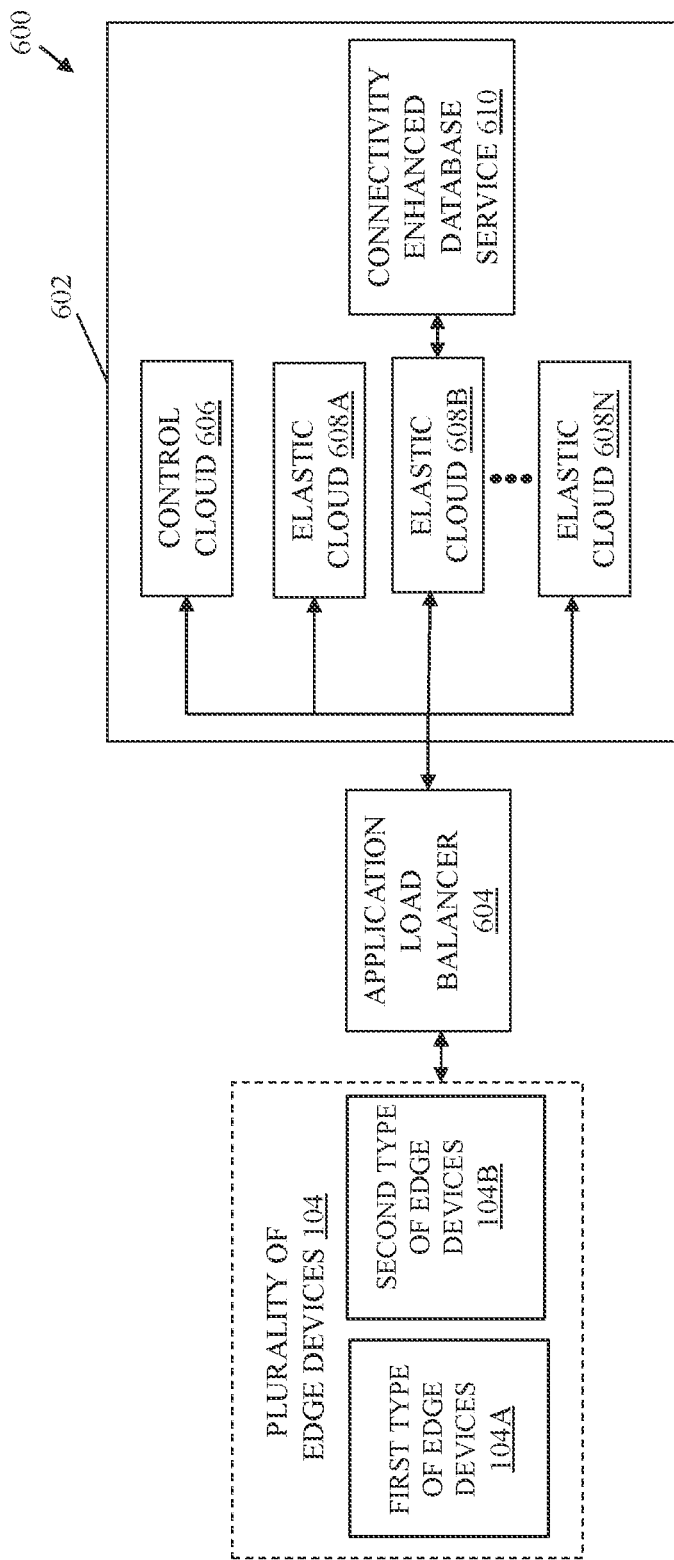
FIG. 6 is a block diagram illustrating a first exemplary scenario for implementation of the central cloud server for high-speed, low-latency wireless connectivity in mobility application, in accordance with an embodiment of the disclosure.

FIG. 6 is a block diagram illustrating a first exemplary scenario for implementation of the central cloud server for high-speed, low-latency wireless connectivity in mobility application, in accordance with an embodiment of the disclosure. FIG. 6 is explained in conjunction with elements from FIGS. 1, 2, 3, 4A, 4B, and 5. With reference to FIG. 6, there is shown a first exemplary scenario 600 that may include a private communication network 602, an application load balancer 604, and the plurality of edge devices 104 communicatively coupled to the private communication network 602 through the application load balancer 604. The private communication network 602 may include a control cloud server (hereinafter simply referred to as a control cloud 606), and a plurality of elastic clouds 608A, 608B, ..., 608N, and a connectivity enhanced database service 610. In an example, the control cloud 606 corresponds to the central cloud server 102, which coordinates and controls other cloud components of the private communication network 602 and the application load balancer 604. In another implementation, the functionalities of the central cloud server 102 may be distributed in the private communication network 602.

The application load balancer 604 may be configured to receive requests from the plurality of edge devices 104 and the plurality of inference servers 118 (FIG. 1), processes them, and routes to the plurality of elastic clouds 608A, 608B, ..., 608N. The control cloud 606 may be configured to set and update rules at the application load balancer 604 to route requests from different type of clients, for example, requests from the first type of edge devices 104A and the second type of edge devices 104B may be routed to different elastic clouds of the plurality of elastic clouds 608A, 608B, ..., 608N. The control cloud 606 may be configured to set rules and attributes for security (e.g., complaint, ambiguous, non-compliant, etc.) to allow authorized edge devices, including UEs to communicate with the private communication network 602.

Each or some of the plurality of elastic clouds 608A, 608B, ..., 608N may be configured to host the machine learning model 214 (FIG. 2), and has the ability of automatic scaling, i.e., quickly increase, or decrease computer processing, memory, and storage resources to meet changing demands based on incoming requests from the plurality of edge devices 104 routed by the application load balancer 604. The plurality of elastic clouds 608A, 608B, ..., 608N may be segregated to provide services to the plurality of edge devices 104 and the plurality of inference servers 118 in accordance with their geographical zones that allows for latency optimization and improved reliability.

The connectivity enhanced database service 610 is used for the update of the connectivity enhanced database 216 hosted in the cloud in the training phase, and further communication of the wireless connectivity enhanced information to the plurality of edge devices 104 in the inference phase. The connectivity enhanced database service 610 is configured such that computational resources, such as memory, performance or I/O, backups, etc. are automatically optimized for low-latency operations, for example, can handle one or more million transactions per second with the ability to adjust computational resources as per demand.

Figure 7A:
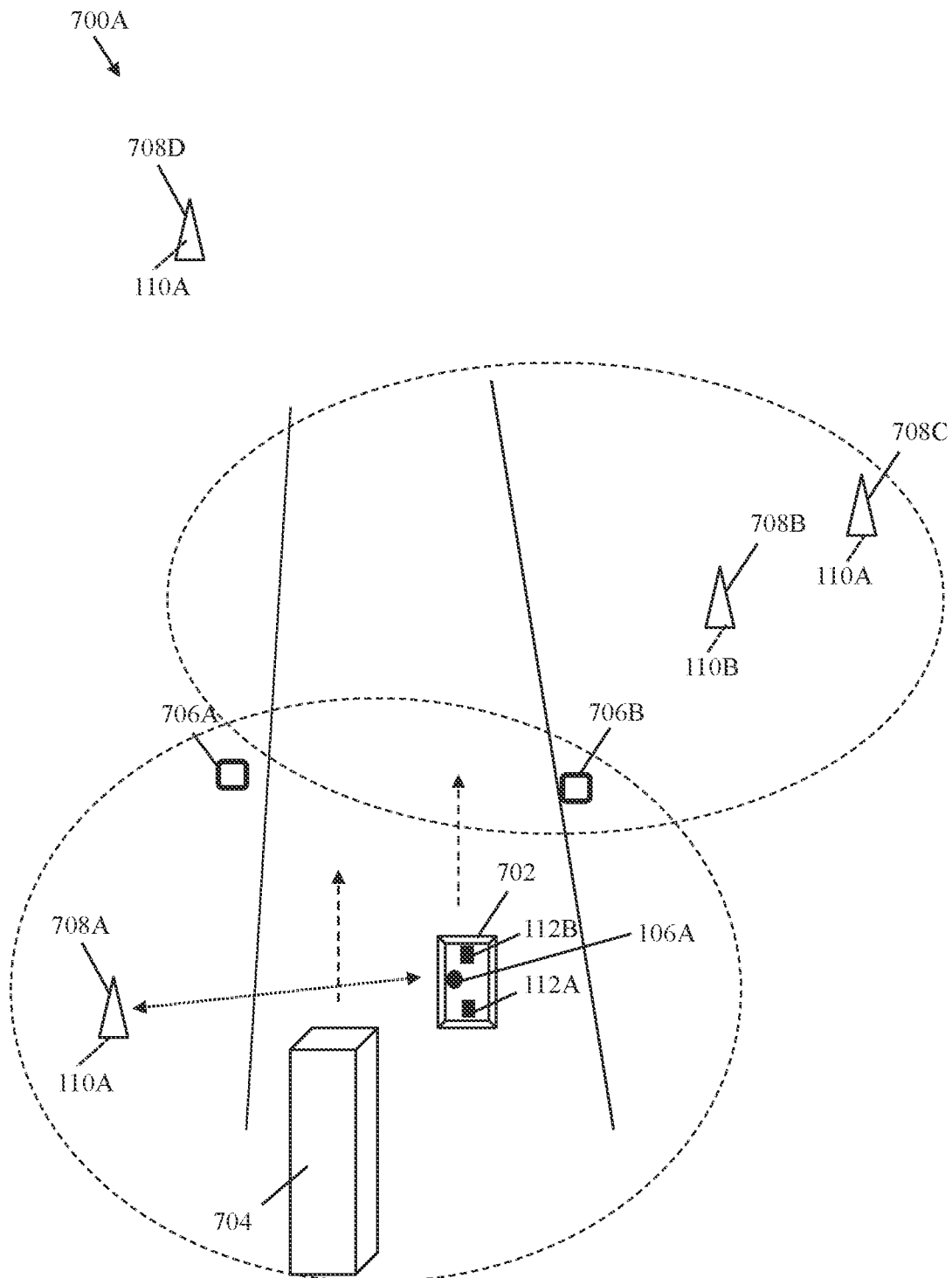
FIGS. 7A and 7B illustrate exemplary scenarios for implementation of the communication system and method high-speed low-latency wireless connectivity in mobility application, in accordance with an embodiment of the disclosure.
Figure 7B:
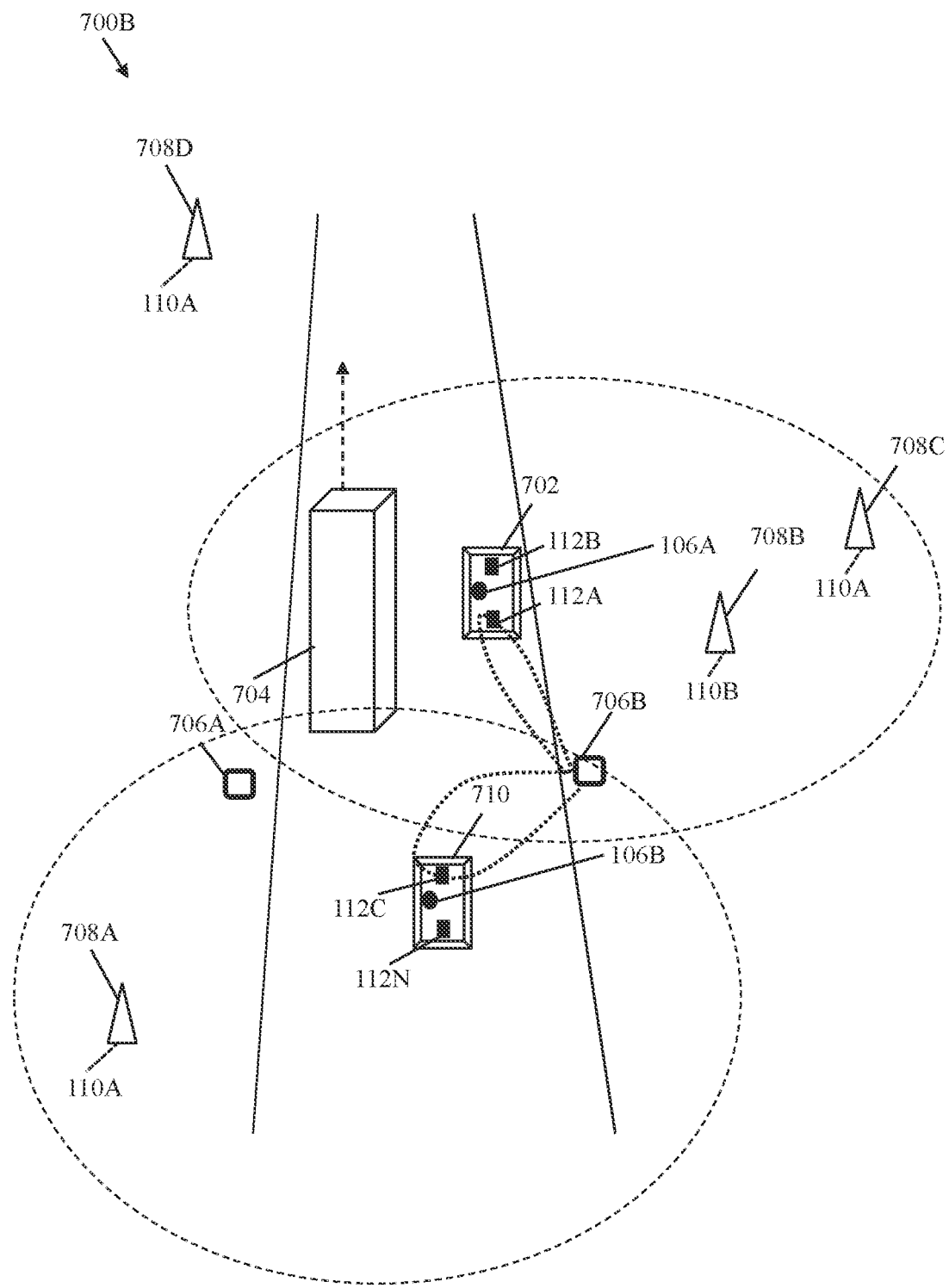

FIGS. 7A and 7B illustrate exemplary scenarios for implementation of the communication system and method high-speed low-latency wireless connectivity in mobility application, in accordance with an embodiment of the disclosure. FIGS. 7A and 7B are explained in conjunction with elements from FIGS. 1, 2, 3, 4A 4B, 5, and 6. With reference to FIGS. 7A and 7B, there is shown a first vehicle 702, a second vehicle 704, a plurality of RSU devices, such as RSU devices 406A and 406B, and a plurality of base stations, such as gNBs 708A, 708B, 708C, and 708D, and the central cloud server 102 (FIGS. 1 and 2). The gNBs 708A, 708C, and 708D may be of the first WCN 110A of a first service provider, and the gNBs 708B may be of the second WCN 110B of a second service provider. In an example, the first vehicle 702 may include the first UE 106A, for example, a smartphone or an in-vehicle device, which has the application installed in it, and which is communicatively coupled to the central cloud server 102 to receive its services. There is further shown the edge devices 112A and 112B arranged on the first vehicle 702.

With reference to FIG. 7A, there is shown an exemplary scenario 700A, in which the first vehicle 702 and the second vehicle 704 are in motion. In this case, the first vehicle 702 may be a semi-autonomous or an autonomous vehicle. The first vehicle 702 by use of the edge devices 112A and 112B may be attached to the gNB 708A of the first WCN 110A while in motion. In some implementations, the first vehicle 702, by use of the edge devices 112A and 112B, may be configured to communicate sensing information in real-time or near real-time to the central cloud server 102. In some implementations, the first vehicle 702, by use of the edge devices 112A and 112B, may be configured to communicate sensing information to the inference server 118A that may be deployed nearest to the current location of the first vehicle 702. The decision to whether to communicate the sensing information directly to the central cloud server 102 or to the nearest deployed inference server 118A may be based on a configured setting on the application and/or based on an amount or a type of data that is to be communicated. This further provides a hybrid computing capability based on a user preference (e.g., as opt-in or opt-out features provided to premium users) to the communication system 100, including the central cloud server 102 and the method of the present disclosure. The second vehicle 704 may also be attached to the gNB 708A. In the exemplary scenario 700A, the central cloud server 102 (or the inference server 118A) may be configured to obtain the sensing information and extract features from the sensing information, and determine that no handover is required for the first vehicle 702 in a real-time or a near time. As a result of the machine learning model 214 and the connectivity enhanced database 216 of the central cloud server 102, it is immediately ascertained that for the extracted features (e.g., a time-of-day, a current position of the first vehicle 702, a distance of the first vehicle 702 from the gNB 708A, a distance of the first vehicle 702 from the RSU devices 706A and 706B, speed, a current 3D environment representation that indicates any possibility of signal blockages or fading, road condition, traffic information, and a current weather condition), the performance state of a wireless connection of the edge devices 112A and 112B of the first vehicle 702 will be greater than a threshold performance value, and there is no need for any handover. There is no need to do any signal measurements at this point because of the connectivity enhanced database 216, which is a low-latency database that can holistically handle multi-dimensional input features.

In accordance with an embodiment, the central cloud server 102 may be configured to proactively predict, based on the recently received sensing information, that RF signal from the gNB 708A may be attenuated or blocked due to some mobile object (i.e., the second vehicle 704) in an upcoming point in time. Thus, the central cloud server 102 (or the inference server 118A) may be further configured to send initial access information much ahead of time to at least one edge device, such as the edge device 112A. The edge device 112A may be configured to temporally store the received initial access information, which is triggered for use just before the upcoming point in time to allow the edge device 112A to connect to the RSU device 706A to receive a beam of RF signal from the RSU device 706A with a signal strength higher than the RF signal directly received from the gNB 708A (i.e., a stronger and directed 5G signal) to maintain QoE even in the dynamically changing environment. Thus, the central cloud server 102 (or the inference server 118A) may be further configured to send initial access information much ahead-of-time to the RSU device 706A and cause the RSU device 706A to direct the beam of RF signal to the donor side of the edge device 112A of the first vehicle 702 when the first vehicle 702 arrives at a location where the signal blockage was expected along the first travel path, and continue to service the edge device 112A for a certain time period until a next handover is determined by the central cloud server 102 (or the inference server 118A).

With reference to FIG. 7B, there is shown an exemplary scenario 700B. In the exemplary scenario 700B, the first vehicle 702 and the second vehicle 704 may further move ahead, as shown. There may be a third vehicle 710, that may also move along the first travel path and may be in a communication range of the RSU devices 706A and 706B. The first vehicle 702 and the third vehicle 710 may further send corresponding sensing information to the central cloud server 102 (or the inference server 118A). However, in this case, the central cloud server 102 (or the first inference server) may be further configured to determine that a handover is required for the first vehicle 702 as well the third vehicle 710, based on the recently received sensing information, which indicates that some mobile object (i.e., the second vehicle 704) may still be blocking a 5G signal from the gNB 708A and may attenuate the signal from the RSU device 706A and that the current location of the first vehicle 702 and the third vehicle 710 may not be optimal for high throughput data rate for existing connection setup (i.e., existing RRC connectivity). Accordingly, the central cloud server 102 (or the inference server 118A) selects an appropriate RSU device, i.e., the RSU device 706B, to communicate wireless connectivity enhanced information, including specific initial access information to the RSU device 706B to bypass the initial access-search on the RSU device 706B, the first vehicle 702 and the third vehicle 710. In this case, the RSU device 706B may be attached to the gNB 708B of the second WCN 110B initially but quickly switches over to the gNB 708C of the first WCN 110A based on the specific initial access information (e.g., a given donor beam index, PCID of gNB 708C, and related ARFCN) received from the central cloud server 102. Thus, the RSU device 706B may be independent of the plurality of different WCNs 110, such as the first WCN 110A and the second WCN 110B. The specific initial access information may further indicate to select a particular service side beam index, e.g., a beam index #42 out of 0-63 and a particular beam configuration based on time-of-day and other sensing information, to service the edge device 112A of the first vehicle 702 bypassing the initial access search at the RSU device 706B as well as the first vehicle 702, where the handover time is much lesser than the standard average mm-wave gNB handover time under same scenarios, such as same cell radius and a vehicle traveling speed.

Based on the wireless connectivity enhanced information, the RSU device 706B may be further configured to dynamically partition an antenna array at the service side of the RSU device 706B into a plurality of sub-arrays (i.e., a subgroup of antenna elements) to establish independent communication channels with the edge device 112A of the first vehicle 702 and the edge device 112C of the third vehicle 710. For example, a first sub-array and a second sub-array may be formed from the dynamic partitioning, where a first channel may be established with the edge device 112A of the first vehicle 702 via the first sub-array of the antenna array and a second channel different and independent of the first channel may be established with the edge device 112C of the third vehicle 710 via the second sub-array of the antenna array. In an example, both the first channel and the second channel may be the mmWave channel. In another example, the first channel may be a mmWave channel, whereas the second channel may be a non-mmWave channel, and a MIMO communication may be established via the second channel. In yet another example, both the first channel and the second channel may be a non-mmWave channel, such as a sub-6 GHz frequency channel.

The second vehicle 704 may not be a known and valid user to receive the services of the central cloud server 102 and thus may need to perform a standard initial-access search to attach to the gNB 708D, which may take a standard time (e.g., the average mmWave gNB handover time is on the order of 10-20 sec, assuming ~500 m cell radius (i.e., coverage area) and traveling speed of 50 MPH). For example, the second vehicle 704 may need to perform the following four beam management operations: a) Beam sweeping, where an exhaustive scanning of a spatial area with a set of beams transmitted and received needs to be done; b) Beam measurement, where signal quality, such as received power (RSRP), Signal to Interference plus Noise Ratio (SINR), of the received beam of RF signals, may need to be executed; c) Beam determination, where an optimal beam (or set of beams) may be selected for establishing directional communications; and d) Beam reporting, it is reported to a network of the signal quality and on the decisions made in the previous phase. The edge device 112A of first vehicle 702 and the edge device 112C of the third vehicle 710 by use of the obtained wireless connectivity enhanced information that includes optimal initial access information may be able to bypass the initial access-search and reduce signaling overhead usually incurred by network processes by avoiding many of such standard beam management operations without any adverse impact while still maintaining QoE with high reliability and consistency.

Figure 8A:
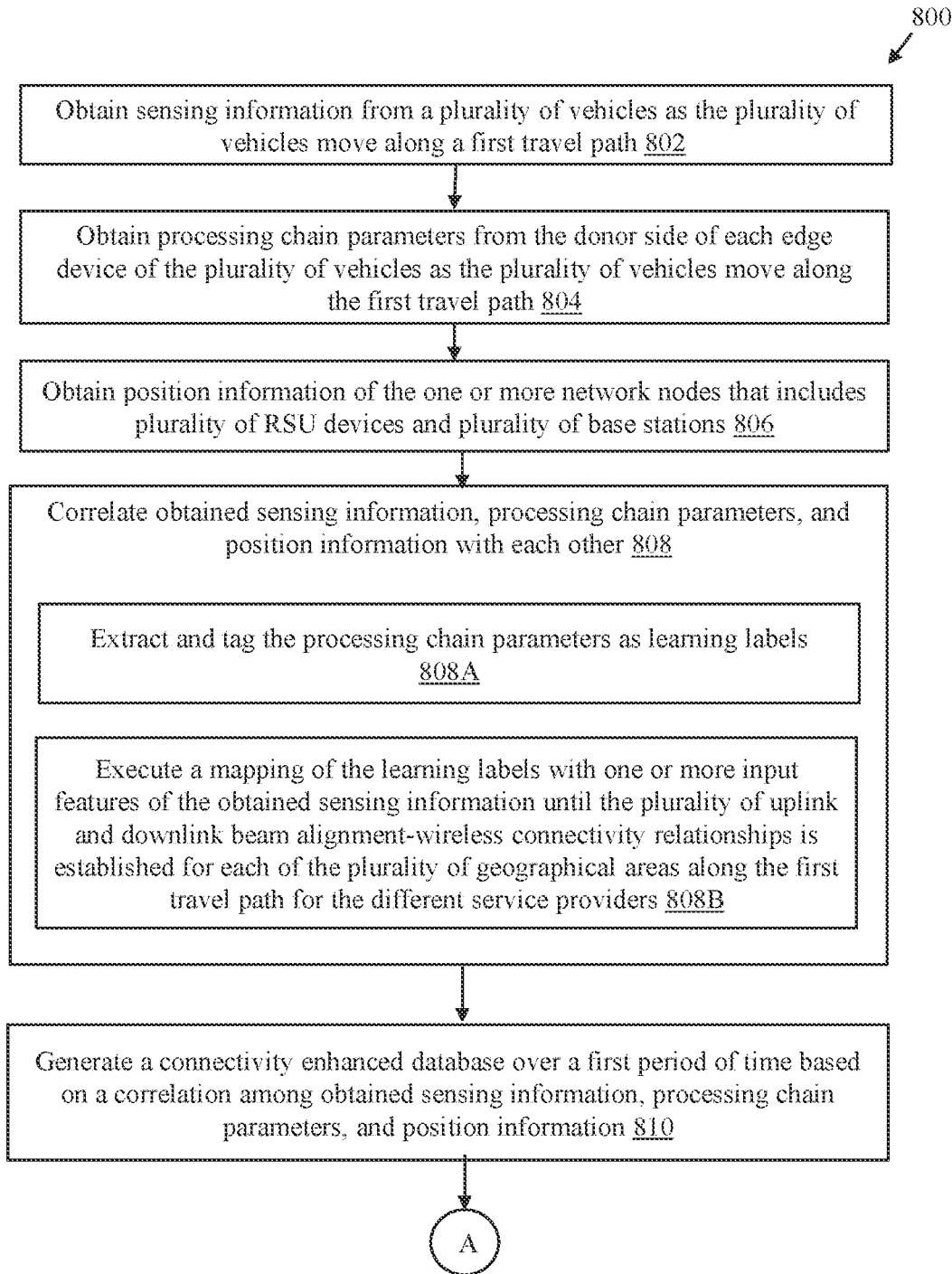
FIGS. 8A and 8B collectively is a flowchart that illustrates an exemplary method for high-speed, low-latency wireless connectivity in mobility application, in accordance with an embodiment of the disclosure.
Figure 8B:
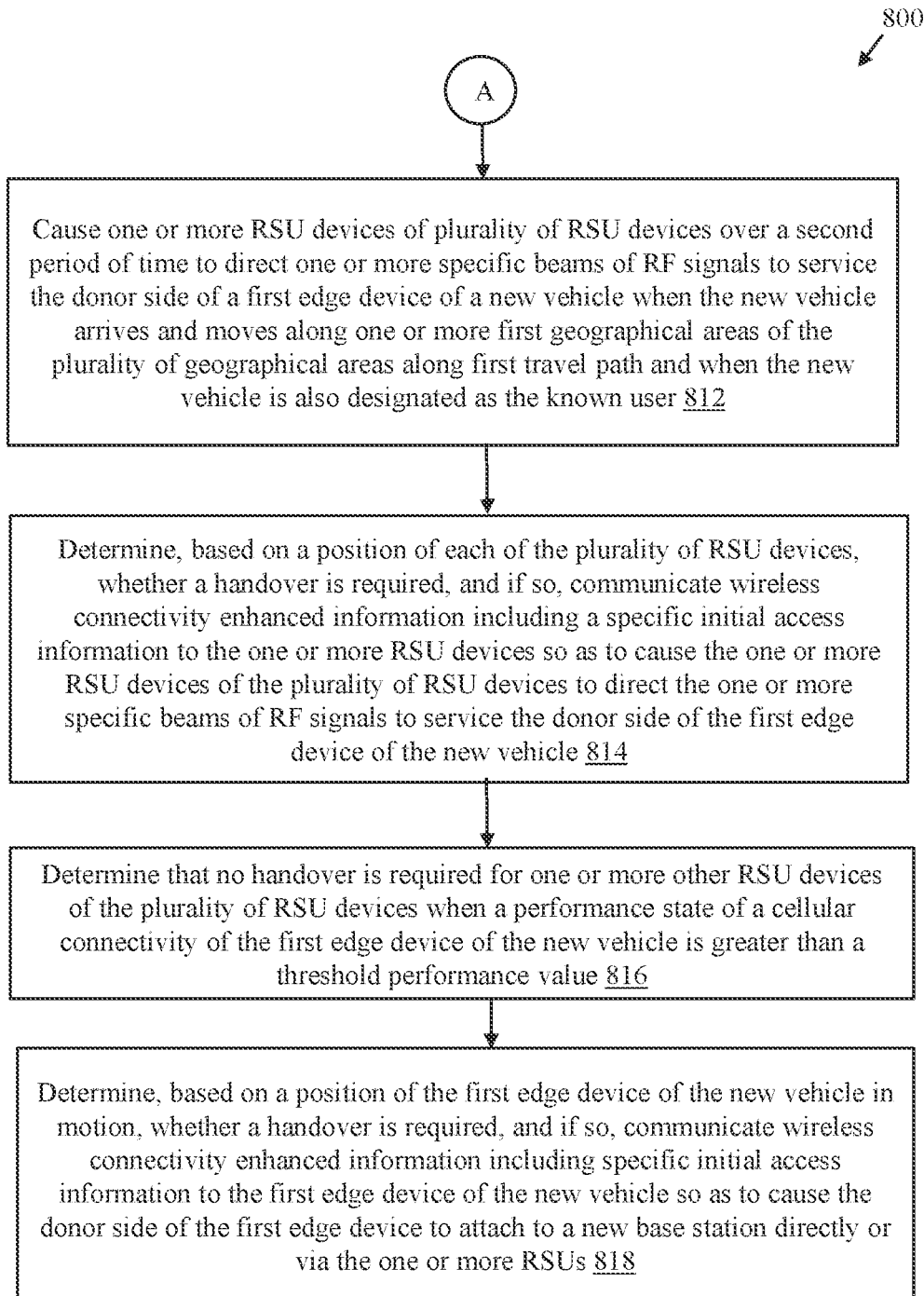

FIGS. 8A and 8B collectively is a flowchart that illustrates an exemplary method for high-speed, low-latency wireless connectivity in mobility application, in accordance with an embodiment of the disclosure. FIGS. 8A and 8B are explained in conjunction with elements from FIGS. 1, 2, 3, 4A, 4B, 5, 6, and 7. With reference to FIGS. 8A and 8B, there is shown a flowchart 800 comprising exemplary operations 802 through 818. The operations of the method depicted in the flowchart 800 may be implemented in the central cloud server 102 (FIG. 1).

At 802, sensing information 208 may be obtained from the plurality of vehicles 116 as the plurality of vehicles 116 move along a first travel path. Each vehicle may comprise one or more edge devices (e.g., the edge devices 112A and 112B) arranged such that the donor side 422A of each edge device faces an exterior of each vehicle to communicate with one or more network nodes and the service side 422B of each edge device faces an interior of each vehicle to service the one or more UEs 106, such as the first UE 106A, within each vehicle of the plurality of vehicles 116. At least the first UE 106A of the one or more UEs 106 may comprise the application 508 that causes the first UE 106A to be designated as a known user to the central cloud server 102. The first travel path may share a plurality of geographical areas that remain covered by a coverage area of one base station, uncovered by any base station, or partially or mutually covered by the plurality of base stations 108 of different service providers. In accordance with an embodiment, the sensing information 208 may comprises two or more of a location of each of the one or more edge devices arranged on each vehicle of the plurality of vehicles 116, a location of the one or more UEs 106, a moving direction of the plurality of vehicles 116, a time-of-day, traffic information, road information, construction information, traffic light information, and information from one or more in-vehicle sensing devices of the plurality of vehicles 116. The sensing information may further comprise a distance of each of the one or more edge devices (e.g., the edge devices 112A and 112B) arranged on each vehicle of the plurality of vehicles 116 from other mobile objects and immobile objects in the surrounding area of each of the plurality of vehicles 116. In an implementation, the sensing information 208 may further comprise weather information. The weather information may be utilized to determine one or more changes in a performance state in different weather conditions of each of the one or more edge devices (e.g., the edge devices 112A and 112B) across the plurality of geographical areas along the first travel path.

At 804, processing chain parameters 210 may be obtained from the donor side 422A of each edge device of the plurality of vehicles 116 as the plurality of vehicles 116 move along the first travel path. The processing chain parameters 210 obtained from each edge device of the plurality of vehicles 116 may comprise radio block information, modem information, information associated with elements of one or more cascaded receiver chains, and one or more cascaded transmitter chains of each edge device.

At 806, position information 212 of the one or more network nodes that includes the plurality of RSU devices 114 and the plurality of base stations 108 exclusively, partially, or mutually covering the plurality of geographical areas may be obtained.

At 808, the obtained sensing information 208, the processing chain parameters 210, and the position information 212 of the one or more network nodes may be correlated with each other. In an implementation, the operation 808 may include sub-operations 808A and 808B. At 808A, the processing chain parameters may be extracted and tagged as learning labels. At 808B, a mapping of the learning labels may be executed with one or more input features of the obtained sensing information 208 until the plurality of uplink and downlink beam alignment-wireless connectivity relationships are established for each of the plurality of geographical areas along the first travel path for the different service providers.

At 810, the connectivity enhanced database 216 may be generated over a first period of time, based on the correlation among the obtained sensing information 208, the processing chain parameters 210, and the position information 212 of the one or more network nodes. The connectivity enhanced database may specify a plurality of uplink-and-downlink beam alignment-wireless connectivity relationships for each of the plurality of geographical areas along the first travel path for the different service providers. In an implementation, the plurality of uplink and downlink beam alignment-wireless connectivity relationships may be determined for different times of a day.

At 812, one or more RSU devices (e.g., the RSU device 114A) of the plurality of RSU devices 114 over a second period of time may be caused to direct one or more specific beams of radio frequency (RF) signals to service the donor side 422A of a first edge device, such as the edge device 112N, of a new vehicle (e.g., the vehicle 116N) when the new vehicle (e.g., the vehicle 116N) arrives and moves along one or more first geographical areas of the plurality of geographical areas along the first travel path and when the new vehicle is also designated as the known user. The one or more specific beams may be selected based on the connectivity enhanced database bypassing an initial access-search on the first edge device (such as the edge device 112N) of the new vehicle as well as the one or more RSU devices. In an example, the one or more specific beams of radio frequency (RF) signals have a frequency of a mmWave frequency signal, a 60 gigahertz (GHz) frequency signal, or a sub-6 GHz frequency signal. Furthermore, the service side of each edge device that faces the interior of each vehicle to service the one or more UEs 106 within each vehicle of the plurality of vehicles 116 may be configured to select one or more beamforming schemes to illuminate space inside each vehicle of the plurality of vehicles 116 such that both an uplink and a downlink communication is established for the one or more UEs 106 via the one or more edge devices arranged in each vehicle.

At 814, it may be determined, based on a position of each of the plurality of RSU devices 114, whether a handover is required, and if so, wireless connectivity enhanced information including specific initial access information may be communicated to the one or more RSU devices so as to cause the one or more RSU devices of the plurality of RSU devices 114 to direct the one or more specific beams of RF signals to service the donor side 422A of the first edge device (e.g., the edge device 112N) of the new vehicle (e.g., the vehicle 116N). The wireless connectivity enhanced information may be communicated directly to each of the one or more RSU devices or indirectly via a first inference server (e.g., the inference server 118A) serving a geographical zone encompassing at least the one or more first geographical areas of the plurality of geographical areas along the first travel path.

At 816, it may be determined that no handover is required for one or more other RSU devices of the plurality of RSU devices 114 when a performance state of a cellular connectivity of first edge device (e.g., the edge device 112N) of the new vehicle (e.g., the vehicle 116N) is greater than a threshold performance value.

At 818, it may be determined, based on a position of the first edge device (e.g., the edge device 112N) of the new vehicle (e.g., the vehicle 116N) in motion, whether a handover is required, and if so, wireless connectivity enhanced information including specific initial access information may be communicated to the first edge device (e.g., the edge device 112N) of the new vehicle (e.g., the vehicle 116N) so as to cause the donor side of the first edge device to attach to a new base station directly or via the one or more RSUs. The wireless connectivity enhanced information may be communicated directly to the first edge device (e.g., the edge device 112N) of the new vehicle (e.g., the vehicle 116N) or indirectly via a first inference server (e.g., the inference server 118A) serving a geographical zone encompassing at least the one or more first geographical areas of the plurality of geographical areas along the first travel path.

In some implementations, the central cloud server 102 may distribute a subset of information from the generated connectivity enhanced database 216 to each of the plurality of inference servers 118 according to a corresponding geographical zone of the plurality of different geographical zones served by each of the plurality of inference servers 118. In such a case, a first inference server (e.g., the inference server 118A) of the plurality of inference servers 118 may be configured to receive a real-time or a near real-time request from each of the one or more RSU devices (e.g., the RSU device 114A), where the real-time or the near real-time request may comprise one or more input features corresponding to the sensing information from the new vehicle (e.g., the vehicle 116N). The first inference server (e.g., the inference server 118A) of the plurality of inference servers 118 may then communicate a response within less than a specified threshold time to each of the one or more RSU devices, where the response may comprise wireless connectivity enhanced information including specific initial access information to each of the one or more RSU devices to bypass the initial access-search on the one or more RSU devices (e.g., the RSU device 114A) as well as the first edge device (e.g., the edge device 112N) of the new vehicle (e.g., the vehicle 116N).

Figure 9:
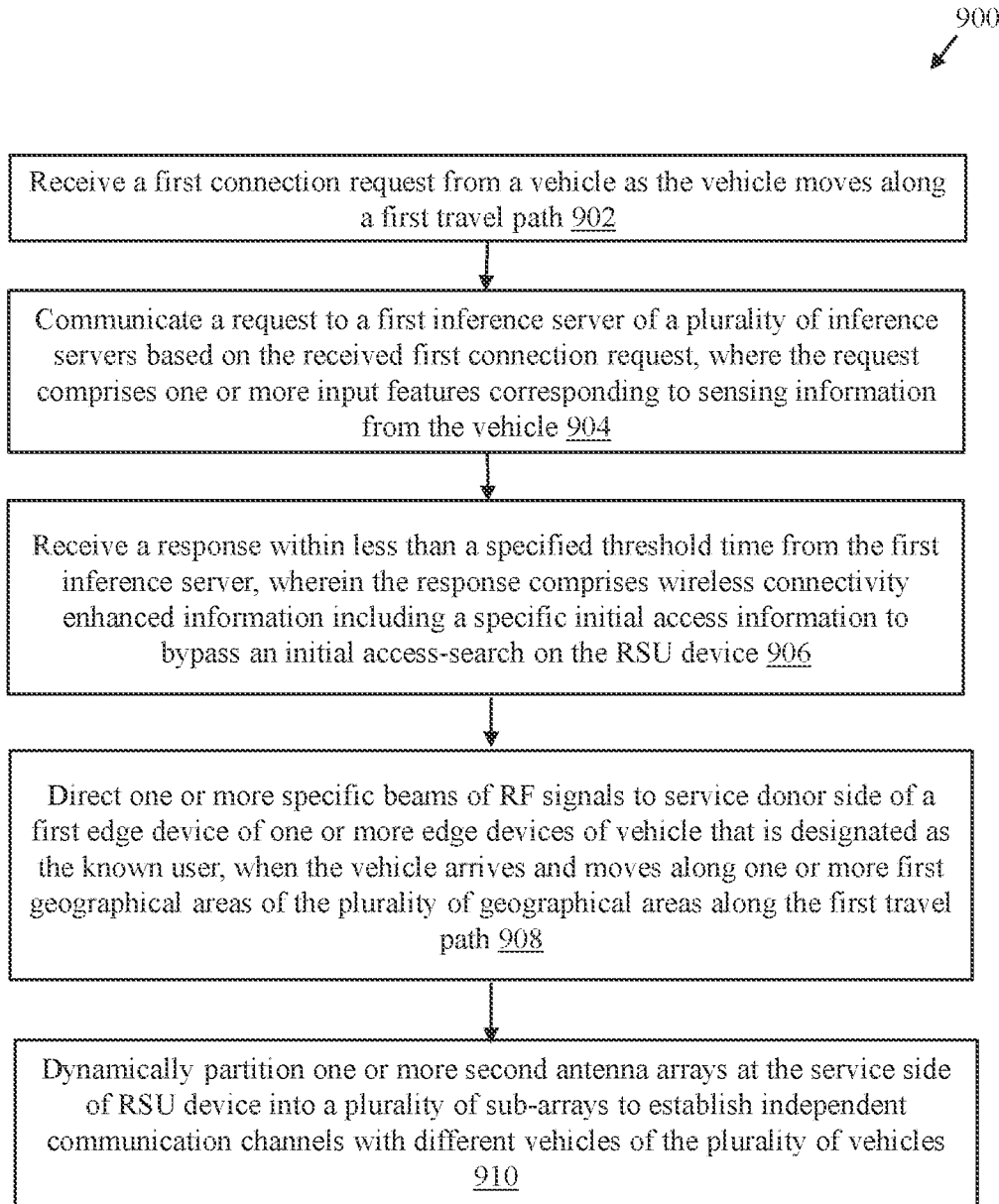
FIG. 9 is a flowchart that illustrates an exemplary method for high-speed, low-latency wireless connectivity in mobility application, in accordance with another embodiment of the disclosure.

FIG. 9 is a flowchart that illustrates an exemplary method for high-speed, low-latency wireless connectivity in mobility application, in accordance with another embodiment of the disclosure. FIG. 9 is explained in conjunction with elements from FIGS. 1, 2, 3, 4A, 4B, 5, 6, and 7. With reference to FIG. 9, there is shown a flowchart 900 comprising exemplary operations 902 through 910. The operations of the method depicted in the flowchart 900 may be implemented in an RSU device, such as the RSU device 114A (FIGS. 1 and 3).

At 902, a first connection request may be received from a vehicle (e.g., the vehicle 116N) as the vehicle 116N moves along a first travel path. The vehicle 116N may comprise one or more edge devices (e.g., the edge device 112N) arranged such that a donor side of each edge device faces an exterior of the vehicle 116N to communicate with one or more network nodes and a service side of each edge device faces an interior of the vehicle 116N to service the one or more UEs 106 within the vehicle 116N. At least the first UE 106A of the one or more UEs 106 may comprise the application 508 that causes the first UE 106A and the vehicle 116N to be designated as a known user to the RSU device 114A. The first travel path may share a plurality of geographical areas that remain covered by a coverage area of one base station, uncovered by any base station, or partially or mutually covered by the plurality of base stations 108 of different service providers.

At 904, a request may be communicated to a first inference server of a plurality of inference servers 118 based on the received first connection request. The request may comprise one or more input features corresponding to sensing information 208 from the vehicle 116N.

At 906, a response may be received within less than a specified threshold time from the first inference server, where the response may comprise wireless connectivity enhanced information including specific initial access information to bypass an initial access search on the RSU device 114A.

At 908, one or more specific beams of radio frequency (RF) signals may be directed to service the donor side of a first edge device (e.g., the edge device 112N) of the one or more edge devices of the vehicle 116N that is designated as the known user, when the vehicle 116N arrives and moves along one or more first geographical areas of the plurality of geographical areas along the first travel path based on the wireless connectivity enhanced information received in the response.

At 910, the one or more second antenna arrays 310 at the service side 302B of the RSU device 114A may be dynamically partitioned into a plurality of sub-arrays (i.e., a sub-group of antenna elements) to establish independent communication channels with different vehicles of the plurality of vehicles 116. An example of the dynamic partitioning of an antenna array to establish independent communication channels is described in detail, for example, in FIG. 7B.

Various embodiments of the disclosure may provide a non-transitory computer-readable medium having stored thereon, computer-implemented instructions that when executed by a computer causes the computer to execute operations that comprise obtaining sensing information 208 from the plurality of vehicles 116 as the plurality of vehicles 116 move along a first travel path. Each vehicle may comprise one or more edge devices (e.g., the edge devices 112A and 112B) arranged such that the donor side 422A of each edge device faces an exterior of each vehicle to communicate with one or more network nodes and the service side 422B of each edge device faces an interior of each vehicle to service the one or more UEs 106, such as the first UE 106A, within each vehicle of the plurality of vehicles 116. At least the first UE 106A of the one or more UEs 106 may comprise the application 508 that causes the first UE 106A to be designated as a known user to the central cloud server 102. The first travel path may share a plurality of geographical areas that remain covered by a coverage area of one base station, uncovered by any base station, or partially or mutually covered by the plurality of base stations 108 of different service providers. The operations further comprise obtaining processing chain parameters 210 from the donor side 422A of each edge device of the plurality of vehicles 116 as the plurality of vehicles 116 move along the first travel path. The operations further comprise obtaining the position information 212 of the one or more network nodes that includes the plurality of RSU devices 114 and the plurality of base stations 108 exclusively, partially, or mutually covering the plurality of geographical areas. The operations further comprise generating the connectivity enhanced database 216 over a first period of time, based on a correlation among the obtained sensing information 208, the processing chain parameters 210, and the position information 212 of the one or more network nodes, where the connectivity enhanced database 216 specifies a plurality of uplink-and-downlink beam alignment-wireless connectivity relationships for each of the plurality of geographical areas along the first travel path for the different service providers. The operations further comprise causing one or more RSU devices of the plurality of RSU devices 114 over a second period of time to direct one or more specific beams of radio frequency (RF) signals to service the donor side of a first edge device (e.g., the edge device 112N) of a new vehicle (e.g., the vehicle 116N) when the new vehicle (e.g., the vehicle 116N) arrives and moves along one or more first geographical areas of the plurality of geographical areas along the first travel path and when the new vehicle is also designated as the known user, where the one or more specific beams are selected based on the connectivity enhanced database 216 bypassing an initial access-search on the first edge device (e.g., the edge device 112N) of the new vehicle (e.g., the vehicle 116N) as well as the one or more RSU devices (e.g., the RSU device 114A).

Various embodiments of the disclosure may include a central cloud server 102 (FIG. 1). The central cloud server 102 comprises the processor 202 configured to obtain sensing information 208 from the plurality of vehicles 116 as the plurality of vehicles 116 move along a first travel path. Each vehicle may comprise one or more edge devices (e.g., the edge devices 112A and 112B) arranged such that the donor side 422A of each edge device faces an exterior of each vehicle to communicate with one or more network nodes and the service side 422B of each edge device faces an interior of each vehicle to service the one or more UEs 106, such as the first UE 106A, within each vehicle of the plurality of vehicles 116. At least the first UE 106A of the one or more UEs 106 may comprise the application 508 that causes the first UE 106A to be designated as a known user to the central cloud server 102. The first travel path may share a plurality of geographical areas that remain covered by a coverage area of one base station, uncovered by any base station, or partially or mutually covered by the plurality of base stations 108 of different service providers. The processor 202 may be further configured to obtain processing chain parameters 210 from the donor side 422A of each edge device of the plurality of vehicles 116 as the plurality of vehicles 116 move along the first travel path. The processor 202 may be further configured to obtaining the position information 212 of the one or more network nodes that includes the plurality of RSU devices 114 and the plurality of base stations 108 exclusively, partially, or mutually covering the plurality of geographical areas. The processor 202 may be further configured to generate the connectivity enhanced database 216 over a first period of time, based on a correlation among the obtained sensing information 208, the processing chain parameters 210, and the position information 212 of the one or more network nodes, where the connectivity enhanced database 216 specifies a plurality of uplink-and-downlink beam alignment-wireless connectivity relationships for each of the plurality of geographical areas along the first travel path for the different service providers. The processor 202 may be further configured to cause one or more RSU devices of the plurality of RSU devices 114 over a second period of time to direct one or more specific beams of radio frequency (RF) signals to service the donor side of a first edge device (e.g., the edge device 112N) of a new vehicle (e.g., the vehicle 116N) when the new vehicle (e.g., the vehicle 116N) arrives and moves along one or more first geographical areas of the plurality of geographical areas along the first travel path and when the new vehicle is also designated as the known user, where the one or more specific beams are selected based on the connectivity enhanced database 216 bypassing an initial access-search on the first edge device (e.g., the edge device 112N) of the new vehicle (e.g., the vehicle 116N) as well as the one or more RSU devices (e.g., the RSU device 114A).

In accordance with an embodiment, each of the one or more edge devices arranged on each vehicle belongs to the first type of edge devices 104A that are mobile, and each of the plurality of RSU devices 114 belongs to the second type of edge devices 104B that is immobile and deployed at a fixed location. Each of the first type of edge devices 104A may be an XG-enabled repeater device, an XG-enabled communication device, a relay device, or a UE controlled by the central cloud server 102, and where each of the second type of edge devices 104B may be at least one of an XG-enabled repeater device, an XG-enabled small cell, or an XG-enabled customer premise equipment, and where the one or more UEs 106 corresponds to at least one of an XG-enabled smartphone, an in-vehicle infotainment system, or another XG-enabled in-vehicle device, wherein the XG corresponds to a 5G or a 6G radio access communication.

Various embodiments of the disclosure may include an RSU device 114A, for example, a relay device, a small cell, or a repeater device deployed at a fixed location. The RSU device 114A comprises control circuitry 314 configured to receive a first connection request from a vehicle (e.g., the vehicle 116N) as the vehicle 116N moves along a first travel path. The vehicle 116N may comprise one or more edge devices (e.g., the edge device 112N) arranged such that a donor side of each edge device faces an exterior of the vehicle 116N to communicate with one or more network nodes and a service side of each edge device faces an interior of the vehicle 116N to service the one or more UEs 106 within the vehicle 116N. At least the first UE 106A of the one or more UEs 106 may comprise the application 508 that causes the first UE 106A and the vehicle 116N to be designated as a known user to the RSU device 114A. The first travel path may share a plurality of geographical areas that remain covered by a coverage area of one base station, uncovered by any base station, or partially or mutually covered by the plurality of base stations 108 of different service providers. The control circuitry 314 may be further configured to communicate a request to a first inference server of a plurality of inference servers 118 based on the received first connection request. The request may comprise one or more input features corresponding to sensing information 208 from the vehicle 116N. The control circuitry 314 may be further configured to receive a response within less than a specified threshold time from the first inference server (e.g., the inference server 118A), where the response may comprise wireless connectivity enhanced information including specific initial access information to bypass an initial access-search on the RSU device 114A. The control circuitry 314 may be further configured to direct one or more specific beams of radio frequency (RF) signals to service the donor side of a first edge device (e.g., the edge device 112N) of the one or more edge devices of the vehicle 116N that is designated as the known user when the vehicle 116N arrives and moves along one or more first geographical areas of the plurality of geographical areas along the first travel path based on the wireless connectivity enhanced information received in the response.

While various embodiments described in the present disclosure have been described above, it should be understood that they have been presented by way of example and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory or any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microcontroller (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:
1. A communication system, comprising:
 a central cloud server that comprises a processor and a connectivity enhanced database, wherein the connectivity enhanced database specifies a plurality of uplink-and-downlink beam alignment-wireless connectivity relationships for a plurality of geographical areas for different service providers, wherein the connectivity enhanced database is generated over a first period of time based on different information received from a plurality of vehicles; and
 the processor configured to:
  obtain sensing information from a first edge device mounted at a new vehicle over a second time period; and cause one or more road-side unit (RSU) devices over a second period of time to direct one or more specific beams of radio frequency (RF) signals to service a donor side of the first edge device of the new vehicle when the new vehicle arrives and moves along one or more first geographical areas of the plurality of geographical areas along a first travel path,
wherein the one or more specific beams are selected based on the connectivity enhanced database bypassing an initial access-search on the first edge device as well as on the one or more RSU devices.

2. The communication system according to claim 1, wherein the first edge device belongs to a first type of edge devices that are movable, and
wherein the one or more RSU devices belongs to a second type of edge devices that are immobile and deployed at different locations.

3. The communication system according to claim 1, wherein the first edge device is communicatively attached to a first base station directly or via a road-side unit (RSU) device of the one or more RSU devices, and
wherein the processor of the central cloud server is further configured to predict whether a cellular connectivity of the first edge device that is in motion is about to become less than a threshold performance value based on the sensing information obtained in the second time period from the first edge device mounted at the new vehicle or from the one or more RSU devices in a vicinity of the first edge device.

4. The communication system according to claim 3, wherein the processor of the central cloud server is further configured to send wireless connectivity enhanced information from the connectivity enhanced database that includes specific initial access information to the first edge device of the new vehicle, and
wherein the specific initial access information causes the donor side of the first edge device to attach to a new base station directly or via the one or more RSU devices bypassing the initial access-search.

5. The communication system according to claim 1, wherein the processor of the central cloud server is further configured to send wireless connectivity enhanced information from the connectivity enhanced database that includes specific initial access information to the one or more RSU devices to cause the one or more RSU devices to direct the one or more specific beams of RF signals to service the donor side of the first edge device of the new vehicle.

6. The communication system according to claim 5, further comprising a first inference server serving a geographical zone encompassing at least the one or more first geographical areas of the plurality of geographical areas along the first travel path, wherein the wireless connectivity enhanced information that includes the specific initial access information is sent directly to the one or more RSU devices or indirectly via the first inference server.

7. The communication system according to claim 1, further comprising a plurality of inference servers that are distributed across a plurality of different geographical zones and act as endpoints of the central cloud server.

8. The communication system according to claim 7, wherein each of the plurality of inference servers is configured to receive a real-time or a near real-time request from an edge device of a plurality of edge devices within its geographical zone, and
wherein the plurality of edge devices comprises at least one of the first edge device and the one or more RSU devices.

9. The communication system according to claim 7, wherein a first inference server of the plurality of inference servers is configured to receive a real-time or a near real-time request from the first edge device or the one or more RSU devices, wherein the real-time or the near real-time request comprises one or more input features corresponding to the obtained sensing information.

10. The communication system according to claim 9, wherein the first inference server of the plurality of inference servers is further configured to communicate a response within less than a specified threshold time to the first edge device or the one or more RSU devices, wherein the response comprises wireless connectivity enhanced information including specific initial access information to bypass the initial access-search on the first edge device and the one or more RSU devices.

11. The communication system according to 7, wherein the processor of the central cloud server is further configured to distribute a subset of information from the connectivity enhanced database to each of the plurality of inference servers according to a corresponding geographical zone of the plurality of different geographical zones served by each of the plurality of inference servers.

12. The communication system according to claim 1, wherein the one or more specific beams of radio frequency (RF) signals have a frequency of: a mmWave frequency signal, a 60 gigahertz (GHz) frequency signal, or a sub-6 GHz frequency signal.

13. The communication system according to claim 1, wherein the obtained sensing information comprises a location of the first edge device and a moving direction of the new vehicle.

14. The communication system according to claim 1, wherein the obtained sensing information comprises a location of the first edge device, a moving direction of the new vehicle, and a time-of-day.

15. The communication system according to claim 1, wherein the obtained sensing information comprises a current location of the first travel path, upcoming locations of the first travel path, a moving direction in the first travel path, and one or more upcoming geographical areas of the first travel path.

16. The communication system according to claim 15, wherein the obtained sensing information further comprises traffic information, road information, construction information, traffic light information, and information from one or more in-vehicle sensing devices of the new vehicle.

17. The communication system according to claim 1, wherein the donor side of the first edge device faces an exterior of the new vehicle to communicate with one or more network nodes and a service side of the first edge device faces an interior of the new vehicle to service one or more user equipment (UEs) within the new vehicle such that both an uplink and a downlink communication is established for the one or more UEs via the first edge device mounted on the new vehicle.

18. The communication system according to claim 1, wherein the first edge device mounted on the new vehicle is one of: an XG-enabled repeater device, an XG-enabled communication device, a relay device, or a user equipment (UE) controlled by the central cloud server, and wherein each of the one or more RSU devices deployed at a fixed location is least one of: an XG-enabled repeater device, an XG-enabled small cell, an evolved-universal terrestrial radio access-new radio (NR) dual connectivity (EN-DC) device, or an XG-enabled customer premise equipment, wherein the XG corresponds to a 5G or a 6G radio access communication.

19. The communication system according to claim 1, wherein the connectivity enhanced database is generated over the first period of time in a training phase based on a correlation among sensing information obtained from the plurality of vehicles when the plurality of vehicles moved previously along the first travel path, processing chain parameters obtained from the donor side of each edge device of the plurality of vehicles when the plurality of vehicles moved along the first travel path, and position information of one or more network nodes that includes the one or more RSU devices and a plurality of base stations exclusively, partially, or mutually covering the plurality of geographical areas.

20. A method for high-speed low-latency wireless connectivity in mobility application, the method comprising:
  in a central cloud server that comprises a connectivity enhanced database generated over a first period of time based on different information received from a plurality of vehicles:
    obtaining, by a processor of the central cloud server, sensing information over a second time period from a first edge device mounted at a new vehicle, wherein the connectivity enhanced database specifies a plurality of uplink-and-downlink beam alignment-wireless connectivity relationships for a plurality of geographical areas for different service providers; and
  causing, by the processor, one or more road-side unit (RSU) devices over a second period of time to direct one or more specific beams of radio frequency (RF) signals to service a donor side of the first edge device of the new vehicle when the new vehicle arrives and moves along one or more first geographical areas of the plurality of geographical areas along a first travel path, wherein the one or more specific beams are selected based on the connectivity enhanced database bypassing an initial access-search on the first edge device as well as on the one or more RSU devices.

* * * * *